(12) United States Patent
Frick

(10) Patent No.: US 7,330,271 B2
(45) Date of Patent: *Feb. 12, 2008

(54) ELECTROMAGNETIC RESONANT SENSOR WITH DIELECTRIC BODY AND VARIABLE GAP CAVITY

(75) Inventor: Roger L. Frick, Minneapolis, MN (US)

(73) Assignee: Rosemount, Inc., Eden Prairie, MN (US)

( * ) Notice: Subject to any disclaimer, the term of this patent is extended or adjusted under 35 U.S.C. 154(b) by 241 days.

This patent is subject to a terminal disclaimer.

(21) Appl. No.: 10/822,425

(22) Filed: Apr. 12, 2004

(65) Prior Publication Data

US 2004/0233458 A1 Nov. 25, 2004

Related U.S. Application Data

(63) Continuation-in-part of application No. 09/996,143, filed on Nov. 28, 2001, now Pat. No. 6,901,101.

(60) Provisional application No. 60/253,703, filed on Nov. 28, 2000, provisional application No. 60/253,704, filed on Nov. 28, 2000, provisional application No. 60/253,705, filed on Nov. 28, 2000.

(51) Int. Cl.
*G01B 9/02* (2006.01)

(52) U.S. Cl. .................................................... 356/480

(58) Field of Classification Search ............... 356/480, 356/454
See application file for complete search history.

(56) References Cited

U.S. PATENT DOCUMENTS

| 2,626,990 | A | * | 1/1953 | Pierce ........................ 333/135 |
| 2,698,923 | A | * | 1/1955 | Edson ........................ 333/228 |
| 3,350,994 | A | | 11/1967 | De Michele |
| 3,756,081 | A | | 9/1973 | Young |
| 3,872,421 | A | | 3/1975 | Rogers et al. |
| 3,878,477 | A | | 4/1975 | Dias et al. |
| 3,883,798 | A | | 5/1975 | Free |

(Continued)

FOREIGN PATENT DOCUMENTS

EP 0 348 039 A2 12/1989

(Continued)

OTHER PUBLICATIONS

Arentoft, et al. Picco, D1 Report, pp. 1-26, Apr. 2001.

(Continued)

*Primary Examiner*—Samuel A. Turner
(74) *Attorney, Agent, or Firm*—Kinney & Lange, P.A.

(57) ABSTRACT

An electromagnetic resonant sensor has a dielectric sensor body through which electromagnetic wave energy is propagated. The sensor body has a cavity, with surfaces facing one another to define a gap that varies as a function of a parameter to be measured. The resonant frequency of an electromagnetic standing wave in the body and the variable gap changes as a function of the gap dimension.

30 Claims, 24 Drawing Sheets

U.S. PATENT DOCUMENTS

| | | | |
|---|---|---|---|
| 3,909,713 A * | 9/1975 | Billeter | 324/636 |
| 3,939,406 A | 2/1976 | Billeter et al. | |
| 3,978,731 A | 9/1976 | Reeder et al. | |
| 4,053,897 A * | 10/1977 | Nerheim | 343/785 |
| 4,143,335 A | 3/1979 | Beukers et al. | |
| 4,163,396 A | 8/1979 | Waugh | |
| 4,265,124 A | 5/1981 | Lim et al. | |
| 4,311,980 A | 1/1982 | Prudenziati | |
| 4,377,851 A | 3/1983 | McNamara | |
| 4,452,533 A | 6/1984 | Miles et al. | |
| 4,594,881 A | 6/1986 | Imamura | |
| 4,689,553 A | 8/1987 | Haddox | |
| 4,737,705 A | 4/1988 | Bitar et al. | |
| 4,758,087 A * | 7/1988 | Hicks, Jr. | 356/480 |
| 4,872,349 A | 10/1989 | Espiritu-Santo | |
| 4,932,265 A | 6/1990 | Skuratovsky et al. | |
| 4,955,028 A | 9/1990 | Alferness et al. | |
| 5,097,476 A | 3/1992 | Thiessen | |
| 5,103,279 A | 4/1992 | Gutteridge | |
| 5,150,060 A | 9/1992 | Bitar | |
| 5,182,779 A | 1/1993 | D'Agostino et al. | |
| 5,182,979 A | 2/1993 | Morgan | |
| 5,187,546 A | 2/1993 | Johnston | |
| 5,191,237 A | 3/1993 | Takebe | |
| 5,241,278 A | 8/1993 | Bitar | |
| 5,319,435 A | 6/1994 | Melle et al. | |
| 5,331,658 A | 7/1994 | Shieh et al. | |
| 5,349,867 A | 9/1994 | Park | |
| 5,361,313 A | 11/1994 | O'Keefe | |
| 5,400,140 A | 3/1995 | Johnston | |
| 5,438,274 A | 8/1995 | Bitar et al. | |
| 5,491,422 A | 2/1996 | Bitar et al. | |
| 5,493,113 A | 2/1996 | Dunphy et al. | |
| 5,509,022 A | 4/1996 | Lowery et al. | |
| 5,513,913 A | 5/1996 | Ball et al. | |
| 5,519,326 A | 5/1996 | Bitar et al. | |
| 5,534,992 A | 7/1996 | Takeshima et al. | |
| 5,564,832 A | 10/1996 | Ball et al. | |
| 5,594,543 A | 1/1997 | de Groot et al. | |
| 5,625,144 A | 4/1997 | Chang | |
| 5,637,865 A | 6/1997 | Bullat et al. | |
| 5,642,375 A | 6/1997 | King et al. | |
| 5,663,792 A | 9/1997 | Killpatrick et al. | |
| 5,808,743 A | 9/1998 | Stephens et al. | |
| 5,822,355 A | 10/1998 | Ahn et al. | |
| 5,825,799 A | 10/1998 | Ho et al. | |
| 5,873,840 A * | 2/1999 | Neff | 600/561 |
| 5,974,060 A | 10/1999 | Byren et al. | |
| 6,034,770 A | 3/2000 | Kim et al. | |
| 6,046,586 A * | 4/2000 | Rinard | 324/300 |
| 6,144,268 A * | 11/2000 | Matsui et al. | 333/134 |
| 6,407,555 B2 * | 6/2002 | Joshi et al. | 324/636 |
| 6,473,218 B1 | 10/2002 | Maleki et al. | |
| 6,484,585 B1 | 11/2002 | Sittler et al. | |
| 6,834,064 B1 * | 12/2004 | Paschotta et al. | 372/30 |
| 6,901,101 B2 * | 5/2005 | Frick | 372/92 |
| 2001/0012149 A1 | 8/2001 | Lin et al. | |
| 2002/0154860 A1 | 10/2002 | Fernald et al. | |
| 2005/0241403 A1 * | 11/2005 | Thomson et al. | 73/773 |

FOREIGN PATENT DOCUMENTS

| | | |
|---|---|---|
| EP | 0 571 107 A1 | 11/1993 |
| JP | 07063855 | 3/1995 |
| WO | PCT WO 95/13638 | 5/1995 |
| WO | WO 02/44672 A2 | 6/2002 |

OTHER PUBLICATIONS

Berkoff, et al. "Experimental Demonstration of a Fiber Bragg Grating Accelerometer", *Photonics Tech. Letters* 8(12): 1677-1679 (1996).

Big Payoffs in a Flash, *Scientific American* Sep. 2000 pp. 73-79.

Cai, et al. "Fiber-Optic Add-Drop Device Based on a Silica Microsphere-Whispering Gallery Mode System," *Photonics Technology Letters* 11(6):686-687 (1999).

Cai, et al. "Highly efficient optical power transfer to whispering-gallery modes by use of a symmetrical dual-coupling configuration," *Optics Letters* 25(4): 260-262 (2000).

Dandliker, et al. "Electronically scanned white-light interferometry: a novel noise-resistant signal processing," *Optics Letters* 17(9): 679-681 (1992).

DeBrabander, et al., "Integrated Optical Ring Resonator with Micromechanical Diaphragm for Pressure Sensing," *Photonics Technology Letters* 6(5):671-673 (1994).

"Fiber Optic Sensors by Blue Road Research," *MEMS—Micromachines in Silicon—MEMS and MST from Standard MEMS*, Sep. 2000.

Fuhr, "Measuring with Light; Part 1" *Sensors* (2000).

Fuhr, "Measuring with Light; Part 2" *Sensors* (2000).

Fuhr, "Measuring with Light; Part 3" Sensors (2002).

"High-quality ring resonators," Zurich Research Laboratory, Sep. 2001.

Jones, et al. "Near-diffractiono-limited high power ('1W) single longitudinal mode CW diode laser tunable from 960 to 980 nm," *Electronics Letters* 31(19):1668-1669 (1995).

Jones, et al. "Stabilization of the frequency, phase and repetition rate of an ultra-short pulse train to Fabry-Perot reference cavity," *Optics Communications* 175:409-418 (2000).

Katagiri, et al. "Dynamic microforce measurement by a distortion detection with a coupled-cavity laser displacement sensor stabilized in a mechanical negative-feedback loop," *Applied Optics* 37(31):7193-7199 (1998).

Katagiri, et al. "Passively Mode-Locked Micromechanically-Tunable Semiconductor Lasers," *IEICE Trans. Electron.* E81(2):151-159 (1998).

Katagiri, "Small Displacement Sensor Measures Tiny Forces," *Sensor Technology* 16(6):7, Feb. 1998.

Kersey, et al. "Fiber Grating Sensors," *Journal of Lightwave Technology* 15(8):1442-1463 (1997).

Koo, et al. "Bragg Grating-Based Laser Sensors Systems with Interferometric Interrogation and Wavelength Division Multiplexing," *Journal of Lightwave Technology* 13(7):1243-1249 (1995).

Kurita, et al. "Ultrafast All-Optical Signal Processing with Mode-Locked Semiconductor Lasers," *IEICE Trans Electron* E81-C(2)129-139 (1998).

"Light-sensing technologies hurdle barriers," *NASA News* p. 28 (1997).

Meggitt, et al. "An all fibre white light interferometric strain measurement systems," *Sensors and Actuators* 79:1-7 (2000).

Meggitt, et al. "Fiber optic white-light interferometric sensors," *Optical Fiber Sensor Tech* pp. 269-312 (1995).

Notcutt et al. "Allan Deviation Measurements of a Cryogenic All-Sapphire Fabry-Perot Reference Cavity," *1996 Conference on Precision Electromagnetic Measurements Digest*, pp. 193-194 (1996).

Rao, et al. "Recent progress in fibre optic low-coherence interferometry," *Meas. Sci. Technol.* 7:981-999 (1996).

"Resonant Structures and Devices Research," MIT Microphotonics Center, Sep. 2001.

Rogister, eta l. "Experimental demonstration of suppression of low-frequency fluctuations and stabilization of an external-cavity laser diode," *Optics Letters* 25(11):808-810 (2000).

Schulz, et al. "Advanced fiber grating strain sensor systems for bridges, structures, and highways,", Sep. 2001.

Schulz, et al. "Heatlh monitoring of an adhesive joint using a multi-axis fiber grating strain sensor system", Sep. 2001.

Sutter, et al. The Shortest KLM Ti-Sapphire Laser Pulse Started by a Semiconductor Saturable Absorber Mirror (SESAM), *IEICE Trans. Electron.* E81-C(2):123-124 (1998).

"Surface Gratings for Optical Coupling with Microspheres" NASA's Jet Propulsion Laboratory , Sep. 2001.

"Systems & Sensors," Bell College of Technology, Aug. 2000.

Tabib-Azar, et al. "Fiber-optics MEMS pressure sensors based on evanescent field interaction," SPIE 3276:135-146, Jan. 1998.

Tabib-Azar, et al. "MOEM Pressure and Other Physical Sensors Using Photon Tunneling and Optical Evanescent Fields with Exponential Sensitivities and Exellent Stabilities," *Conf. On Microelectronic Structures and MEMS for Optical Processing* 3513:210-222 (1998).

Talvitie, et al. "Improved frequency stability of an external cavity diode laser by eliminating and pressure effects," *Appklied Optics* 35(21):4166-4168 (1996).

Technology Transfer, OPLL sensor eases strain monitoring, NASA news, Jul. 2000, p. 30.

Arentoft, et al. Picco, D1 Report, pp. 1-26.

"Fiber Optic Sensors by Blue Road Research," *MEMS—Micromachines in Silicon—MEMS and MST from Standard MEMS*.

"High-quality ring resonators," Zurich Research Laboratory.

Katagiri, "Small Displacement Sensor Measures Tiny Forces," *Sensor Technology* 16(6):7.

"Resonant Structures and Devices Research," MIT Microphotonics Center.

Schulz, et al. "Advanced fiber grating strain sensor systems for bridges, structures, and highways,".

Schulz, et al. "Heatlh monitoring of an adhesive joint using a multi-axis fiber grating strain sensor system".

"Surface Gratings for Optical Coupling with Microspheres" NASA's Jet Propulsion Laboratory.

"Systems & Sensors," Bell College of Technology.

Tabib-Azar, et al. "Fiber-optics MEMS pressure sensors based on evanescent field interaction," SPIE 3276:135-146.

Udem, et al. "Accurate measurement of large optical frequency differences with a mode-locked laser," *Optics Letters* 24(13):881-883 (1999).

Vasil'ev, et al. "A Diode Laser with an External High-Q Microcavity" LEOS Summer Topical Meeting, pp. 31-32 (1997).

Vassilovski, et al. "Carrier Transport Effects in Active and Passive Modelocking of Monolithic Quantum-Well Lasers at Millimeter-Wave Frequencies," *Photonics Tech. Letters* 8(12):1603-1605 (1996).

Weisbuch et al., "Advances in Photonic Crystals," *Phys. Stat. Sol.* 221:93-99 (2000).

Weiss, "Spectrum deftly takes visible light's pulse," *Science News* 157(23):358-359 (2000).

Xinqi, et al. "A Narrow Line Width Tunable Diode Laser System," *Chinese Journal of Lasers*, B7(3):217-221 (1998).

* cited by examiner

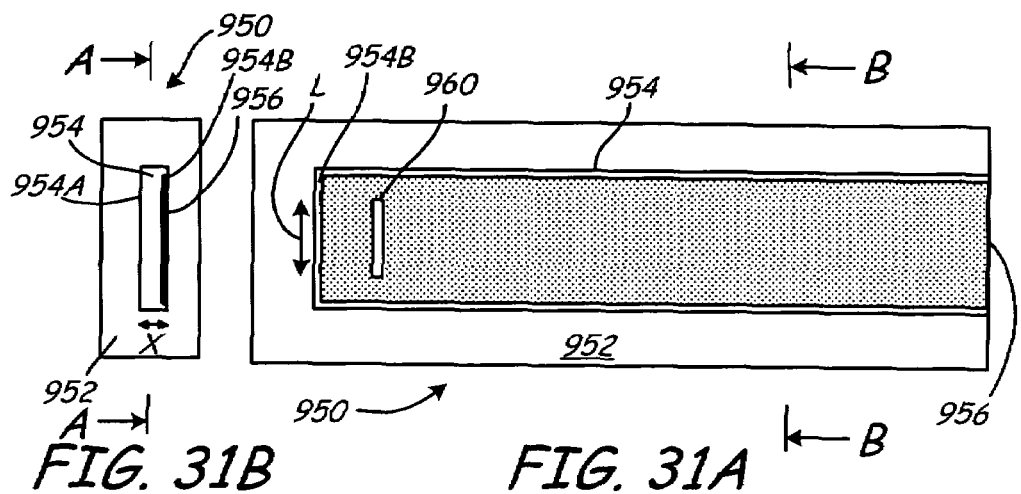
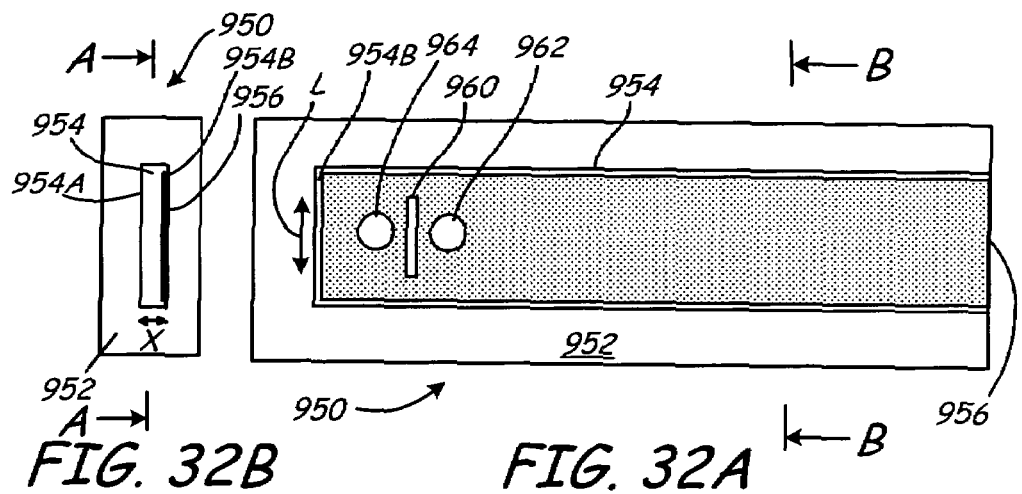
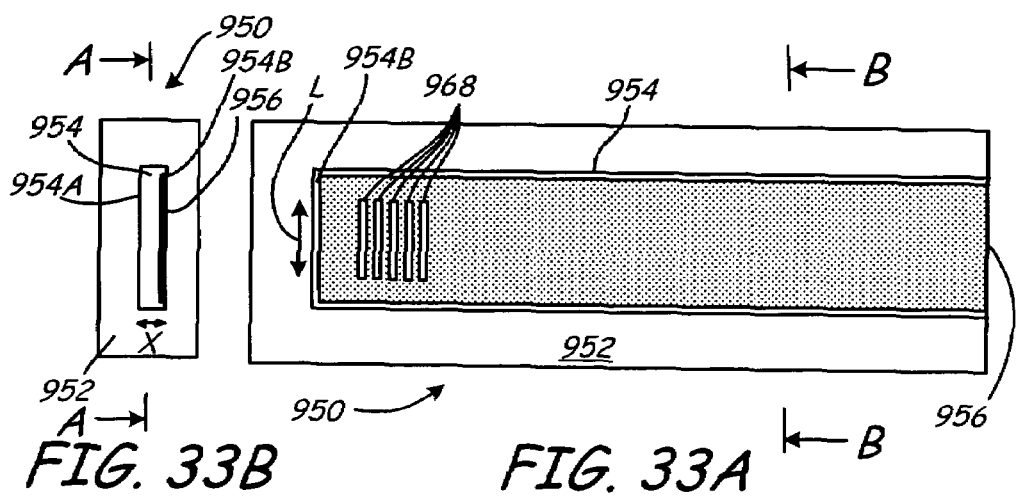

ELECTROMAGNETIC RESONANT SENSOR WITH DIELECTRIC BODY AND VARIABLE GAP CAVITY

CROSS-REFERENCE TO RELATED APPLICATION(S)

This application is a continuation-in-part of application Ser. No. 09/996,143, filed Nov. 28, 2001 that claims priority from U.S. Provisional Applications 60/253,703, 60,253,704 and 60,253,705, all filed Nov. 28, 2000.

BACKGROUND OF THE INVENTION

The present invention relates generally to sensors. More specifically, the invention relates to electromagnetic resonant sensors used to measure parameters commonly measured in industrial process or flow systems—parameters such as pressure, temperature, flow rate, strain, and material composition.

BRIEF SUMMARY OF THE INVENTION

The invention is a electromagnetic resonant sensor having a body with a cavity gap that changes in dimension as a function of a parameter to be measured. Electromagnetic energy is supplied to the sensor, to produce an electromagnetic standing wave within the sensor body and the cavity gap. The resonant frequency of the electromagnetic standing wave is a function of the cavity gap. An output of the sensor is produced based upon the resonant frequency, so that the output varies as a function of the parameter to be measured.

BRIEF DESCRIPTION OF THE DRAWINGS

FIGS. 30A and 30B, 31A and 31B, 32A and 32B, 33A and 33B, 34A and 34B, and 35A and 35B are sectional views of additional embodiments of slot antenna resonant transmission line sensors.

DETAILED DESCRIPTION

FIGS. 1-18 show embodiments of the high Q resonant sensors of the invention operating with electromagnetic radiation generally in optical ranges from long-infrared to ultraviolet wavelengths. FIGS. 19-38B show embodiments of the high Q resonant sensors of the invention operating with electromagnetic radiation in the microwave portion of the spectrum (i.e. up to long-infrared wavelengths).

Generally, FIGS. 1-18 include lasers, preferably operating in a pulsed output mode, that produce a laser signal of a repetition rate or frequency modulated by a measurable parameter. By using a mode locked laser, conventional high-speed electronics can be used to measure the modulated signal, and the repetition rate or frequency of the laser signal can be measured with high resolution. By measuring the frequency of the laser signal, a value for the measurable parameter can be derived.

In some embodiments, a high Q optical resonator produces the laser signal with a frequency dependent upon the measurable parameter. The high Q resonator can be internal or external to the laser. The devices have lower power consumption and improved accuracy over the state of the art. The devices may be used to measure changes in a measurable parameter or they may be used to make absolute measurements. Further applications and further embodiments will be apparent to persons of ordinary skill in the art. For example, the devices described may be adapted for use as tunable optical filters, tunable laser sources, and other all optical applications.

Figure 1:
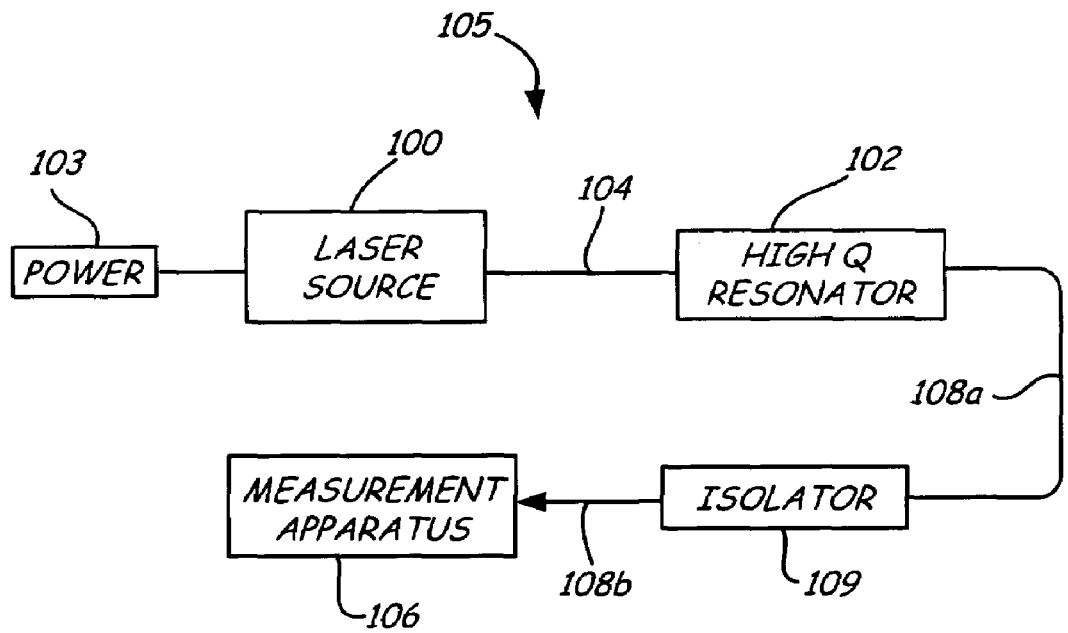
FIG. 1 is a block illustration of an external high Q resonator coupled to a laser in accordance with an embodiment.
Figure 2:
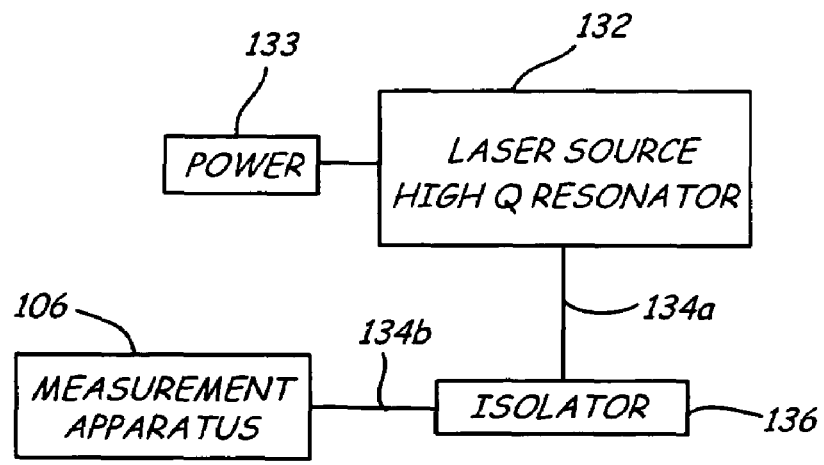
FIG. 2 is a block illustration of a laser with an internal resonator according to an embodiment.

FIGS. 1 and 2 show exemplary embodiments. FIG. 1 shows a laser 100 coupled to an external high Q resonator 102 through a coupler 104, generally shown. The laser 100 may be a fiber-doped laser, a ruby laser, or a diode laser. Other laser sources are contemplated. The laser 100 may be an amplification stage, such as an optical parametric amplifier or fiber amplifier stage pumped by a laser source. The laser source 100 may also be replaced with a light emitting diode (LED). By way of example only, the laser source 100 is shown receiving power from a power source 103, which as it would be understood by persons of ordinary skill in the art may take the form of an optical or electrical power source. The laser energy is preferably at a wavelength in the visible or infrared region, though the laser energy may be within the far-infrared and microwave regions as well. Embodiments using microwave energy will be further discussed in conjunction with FIGS. 19-38B.

In the preferred embodiment, the coupler 104 is an optical fiber or optical waveguide, and coupling is achieved through low-loss evanescent coupling. Coupling may be achieved through partially transmissive mirrors, waveguide taps, or other known means for coupling optical signals.

The laser source 100 provides a laser energy to the high Q resonator 102 through the coupler 104. The laser energy coupled from the laser 100 to the resonator 102 is at a wavelength corresponding to the resonance of the laser cavity within the laser 100. Such laser cavities, however, have low Q and produce an output of relatively large bandwidth. The Q of the external resonator 102 is preferably substantially higher than the Q of the laser cavity within the laser 100. For example, in the preferred embodiment, the Q of the resonator 102 would be at least 100. Typical resonators only have Q values between 3 and 100 and are limited by the mirrors forming the resonant cavity and the desired power output.

It is generally known that a low Q oscillator system will lock onto the frequency of a high Q resonator if there is sufficient coupling between the oscillator and the resonator and if the frequency ranges of the two regions overlap. The low Q laser cavity of laser 100 locks onto the resonance frequency of a high Q resonator 102. That is, the exchange of energy between the high Q resonator 102 and the lower Q laser 100 will lock the laser signal of the entire system to a frequency and bandwidth defined by the resonator 102. The result is that the system produces a laser signal of a narrow bandwidth and centered at a resonance frequency of the resonator 102.

The laser source 100 may be a continuous wave (CW) source or a preferably a pulse mode locked laser source. If the source 100 is a CW source, then the laser signal from the system locks onto the resonant frequency of the resonator 102 and has a narrowed bandwidth induced by the high Q of the resonator 102. Here, a spectrometer would be used to measure the frequency of the laser signal. If the source 100 is a pulse mode locked laser source, the resonator 102 additionally determines the repetition rate of the pulse train. Here, conventional electronic detectors can be used to measure the sub 100 GHz repetition rate.

Optical resonators have multiple resonant frequencies. It is desirable, however, that only a single resonant frequency be located within the bandwidth of the laser energy supplied by the laser sources. That is, the laser signal exists at a single consistent resonant frequency. This condition will reduce the mode hopping that occurs in some state of the art laser systems. A distributed feedback laser (DFB) laser may be used as the laser source 100 to achieve a bandwidth that allows a single resonant frequency. The physical parameters of the resonator 102 could be altered to achieve single resonance, as well.

The resonator 102 is formed of an optically transparent material. The material may be a lasing material or a non-lasing material. Suitable materials include sapphire, quartz, doped quartz, polysilicon, and silicon. These materials exhibit low optical losses. These materials also exhibit good mechanical properties that respond precisely and consistently to changes in the measurable parameters and do not permanently deform under pressure or force, but instead return to their original shapes after the measurable parameter has returned to a steady state value. Preferably, materials that allow propagation under total internal reflection are used. The total internal reflection and low optical losses allow for very high Q resonators.

The resonator 102 is characterized by having resonant frequencies that depend upon measurable parameters near the resonator 102. Herein, "measurable parameters" means those parameters associated with an external force or pressure. Pressure (absolute and differential), temperature, flow rate, material composition, force, and strain are examples. Laser source 100 and high Q resonator 102 collectively form an optical sensor 105, which produces a laser signal or sensed signal, dependent upon a measurable parameter.

The laser signal is supplied to a measuring apparatus 106 through structure generally shown as couplers 108A and 108B and isolator 109. If the laser source 100 is a pulse mode locked laser, the measuring apparatus 106 could be a conventional high-speed electronics detector. If the laser source 100 is a continuous wave source, the measuring apparatus 106 is preferably a spectrometer or other suitable device for measuring signal frequency.

The isolator 109 prevents back reflected signals of the measuring apparatus 106 from entering into the resonator 102. As the laser signal is dependent upon a measurable parameter, the measuring apparatus 106 may additionally derive a value for the measurable parameter by measuring the frequency or repetition rate of the laser signal and calculating a measurable parameter value corresponding to that measurement. This derivation is performed in known ways. The coupling between the resonator 102 and the measuring apparatus 106 may be achieved through fiber coupling, mirror coupling, taps, evanescent coupling or other suitable coupling types.

The resonator 102 has a high Q value and, therefore, the energy coupled between the laser 100 and the resonator 102 may be very low and proper locking onto a resonant frequency of the resonator 102 will occur. Another advantage of using the high Q external resonator 102 is that the signal/noise (S/N) ratio of the system improves. Generally, the S/N ratio and resolution of a frequency modulated laser system is limited by the frequency jitter in the lasing mechanism. This jitter has many sources; mode hopping, power supply noise, thermal noise, quantum fluctuations and gain noise in the lasing media are a few. Amplitude noise fluctuations modulate the lasing frequency itself so that the resulting frequency noise cannot be filtered out once it has been generated.

By way of example, the S/N ratio is proportional to the GF, defined above, under the following proportionality: S/N=GF−$f_r f_n$. The value $f_n$ is the noise frequency dither inherent in $f_r$. A high GF results in a high S/N ratio. Coupling a laser output into an external high Q resonator, like resonator 102, means that laser output frequency will be determined by the resonator and, therefore $f_n$ will be low and the S/N ratio characteristics will be determined primarily by the characteristics in the external resonator. The resonators shown herein are also characterized by high GF and therefore high S/N ratio.

The external resonator structure of FIG. 1 is useful to make measurements in environments hostile to laser operation, because the sensing mechanism (i.e., the resonator 102) is remote to the laser source 100. Also, in this embodiment, the external resonator 102 is not susceptible to the high temperatures produced by the laser source 100.

FIG. 2 is block depiction of an alternative embodiment of an optical sensor 130, in which a laser 132 is formed of an internal high Q resonator. Here, the high Q resonator forms the laser 132 and, therefore, functions as the laser gain cavity. The high Q resonator is formed of a material that lases upon being pumped by an appropriate feed energy. By way of example only, the laser source 132 is shown receiving power from a power source 133, which as it would be understood by persons of ordinary skill in the art may take the form of an optical or electrical power source. Semiconductor materials, doped sapphire, doped quartz, and other materials may also be used to form the internal resonator. Doped quartz is particularly beneficial because when quartz is doped with the rare earth element erbium the quartz can be made to emit laser light of 1550 nm, i.e., the preferred low-loss wavelength for current optical fiber communications. The laser signal is produced by the laser 132 and provided to the measuring apparatus 106 through couplers 134A and 134B and an isolator 136, similar to that described above.

Provided in a preferred embodiment is a frequency modulated laser source that produces a pulse train as the laser signal. The repetition rate of the pulses varies as a function of a measurable parameter acting on a resonator, and, therefore, the entire structure forms a high resolution and high accuracy optical sensor. For example, simply counting of a 1 GHz change (induced by a change in a measurable parameter) in a 100 GHz signal would give a resolution of 1 ppb over a 1 second measurement. State of the art lasers have noise bandwidths of a few KHz with a base frequency of about 200,000 GHz, indicating that a resolution of more than 30 bits is attainable with such an optical sensor.

There are various ways known in the art to set-up a mode-locked laser such as using either passive mode-locking or active mode-locking. Ti:Sapphire mode-locked lasers pumped with an Argon continuous wave laser source or pumped with an Nd:Yag laser continuous wave source have been shown. Others have shown passive mode-locking using semiconductor lasers and micro-mechanical tuning. Any mode-locked laser would be suitable as the laser source 100 of FIG. 1 and various mode-lock laser set-ups may be used in the embodiment of FIG. 2. Thus, pulse mode locked operation is contemplated in both-the external and internal resonator embodiments.

Figure 3A:
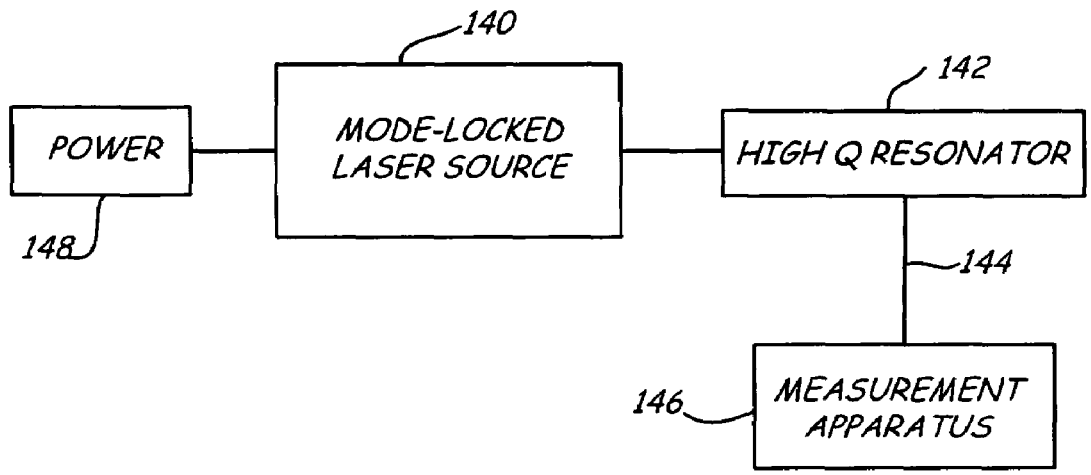
FIG. 3A is a block illustration of a mode-locked laser having an optical gain medium in accordance with an embodiment.

An exemplary mode-locked laser is shown in FIG. 3A, showing a laser 140 coupled to an external High Q resonator 142 for producing a mode-locked laser signal 144 at an operating frequency related to a measurable parameter acting on the resonator 142. The laser 140 includes a mode-locking mechanism, which can take a variety of forms as known in the art. For instance, a saturable amplifier can be introduced into the lasing cavity such that only short pulses are able to pass without attenuation. The laser signal 144 is a pulsed laser signal having a repetition rate dependent upon the measurable parameter acting on a sensing (e.g., outer) surface of the high Q resonator 142. In particular, pulsed laser signals 144 of the laser 140 locked to the external high Q resonator 142 have a repetition rate determined by $F=F_{in}(1-h/nL)$ where h is the round trip length of the external resonator, L is the round trip length of the mode locked laser, n is the effective refractive index, and $F_{in}$ is the round trip frequency of the mode locked laser. (See "Passively Mode-Locked Micromechanically-Tunable Semiconductor Lasers", Katagirie et al., IEICE Trans. Electron., Vol. E81-C. No. 2, February 1998). A measuring apparatus 146 measures this repetition rate and uses that measurement to derive a value for the measurable parameter. The laser 140 is exemplarily shown being pumped by a power source 148, which represents any of the known sources of pump energy for a mode-locked laser.

Figure 3B:
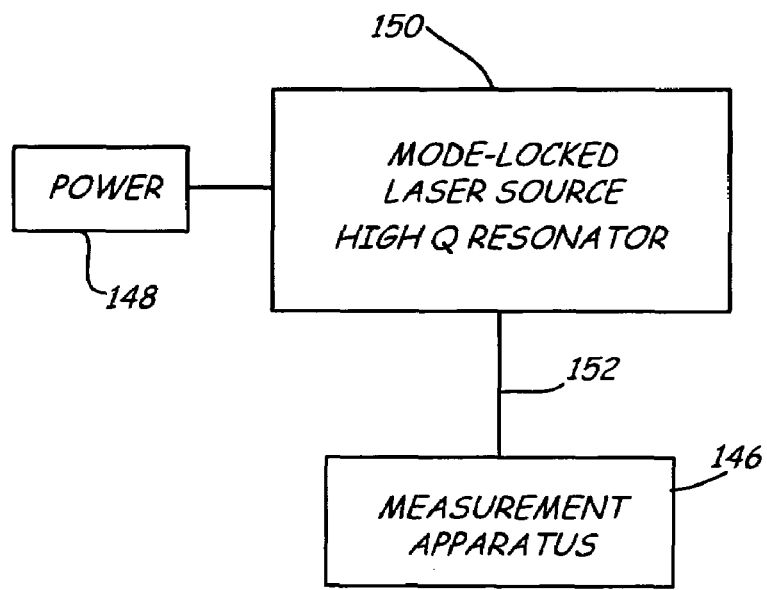
FIG. 3B is a block illustration of a mode-locked laser having an optical gain medium in accordance with an embodiment.

Referring to FIG. 3B, a mode locked laser 150 may alternatively incorporate the high Q resonator internal to the lasing cavity (similar to FIG. 2) to produce the mode locked laser signal 152. With this internal resonator structure, the repetition rate of the laser signal 152 is simply the round trip time of the resonator. As noted above, the mode locking mechanism of the laser 150 can be accomplished through a variety of techniques known in the art such as introducing a saturable amplifier section into the loop or using active mode locking. The measuring apparatus 146 then measures the repetition rate of the laser signal 152 to derive a value for the measurable parameter acting on a sensing surface of the laser/resonator. Though not shown, the embodiments of FIGS. 3A and 3B may be implemented with isolators and other optical components (such as varied optical couplers) as desired.

Some exemplary resonator structures characterized by a resonant frequency dependent upon a measurable parameter will now be discussed.

Figure 4:
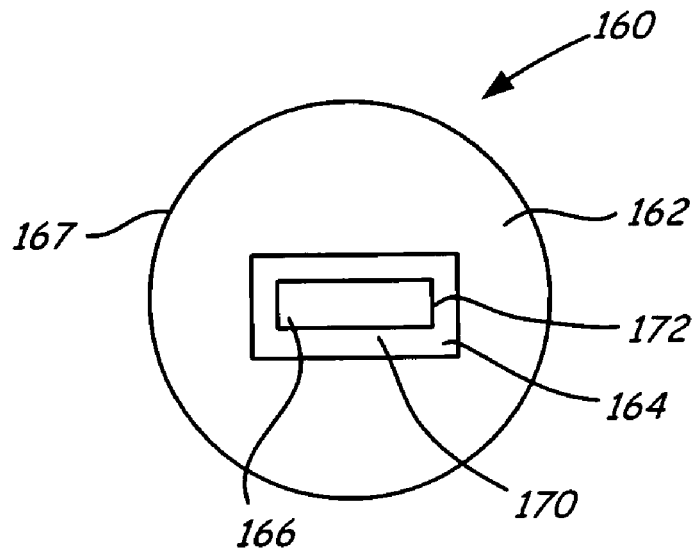
FIG. 4 is a cross-sectional view of an optical fiber in accordance with an embodiment.
Figure 5:
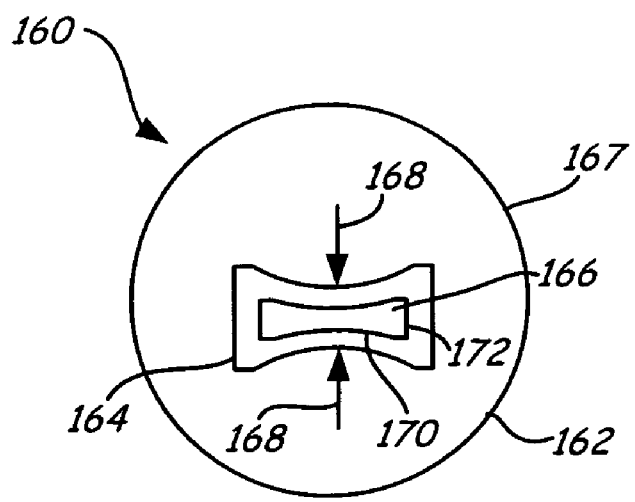
FIG. 5 is a cross-sectional view of the optical fiber of FIG. 4 after a measurable parameter has changed at a sensing surface of the fiber.

FIGS. 4 and 5 depict a cross section of an optical fiber 160 that may be used to form the resonator 102 or 132. The optical fiber 160 may be formed of any of the standard materials used in optical fibers and is preferably a single mode fiber. The optical fiber 160 is characterized by a cladding region 162 and a higher index of refraction core region 164. This configuration confines propagation primarily to the core 164 and a signal propagating within the core 164 propagates under total internal reflection.

The optical fiber 160 contains a cavity 166 defining a variable gap, which may be evacuated or contain a gas or other suitable material. The cavity 166 is formed in the fiber 160 through known processing methods, such as etching or drawing down a blank or preform that includes the cavity. In FIG. 4, the cavity 166 is entirely disposed within the core 164.

Figure 9:
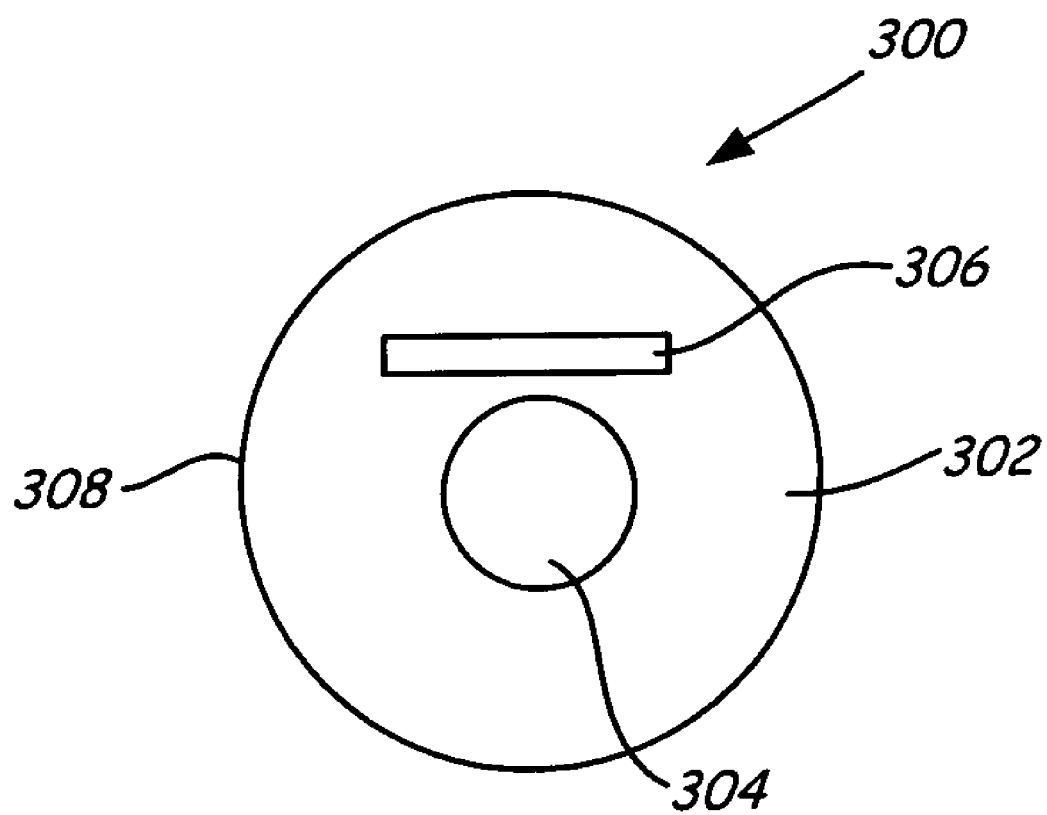
FIG. 9 is a cross-sectional profile of an optical fiber in accordance with an embodiment alternative to that of FIGS. 4 and 5.

The cavity 166 may also be partially within the core 164 or entirely external to the core 164, as shown in the embodiment of FIG. 9. In the preferred embodiment, the cavity 166 is similarly shaped in cross-section to that of the core 164. Also, in a preferred embodiment the cavity 166 would be symmetric to the core 164. While both the cavity 166 and the core 164 are shown with a rectilinear cross-section, it would be understood that other cross-sectional profiles may be used. For example, other shapes for the cavity could be used such as a multiplicity of closely spaced round holes which change size in response to a sensed variable or measurable parameter. The cavity 166 extends longitudinally with the core 164 along at least a portion of the fiber 160.

The gap of the cavity 166 varies in response to changes in measurable parameters, for example, changes in pressure or force external to the fiber 160. In operation, an increase in the pressure on the outside of the fiber 160 applies force to an outer wall or sensing surface 167 of the fiber 160, which results in radial forces being applied through the cladding region 162 and on the cavity 166. Due to the geometry of the cavity 166, some of the radial forces will not alter the cavity shape. Other forces, principally forces represented by arrows 168 (see, FIG. 2), will act to compress the cavity 166. Therefore, an increase in pressure at the sensing surface 167 of the fiber 160 will result in the compression, i.e., inward displacement, of the cavity 166. Though, not shown it would be understood that a decrease in pressure would result in an expansion of the cavity 166.

Changes in the other measurable parameters would alter the cavity 166, as well. For example, the fiber 160 may be placed within a processing flow system such that changes in flow rate, temperature, or material composition alter the geometry of the cavity 166. Changes in any of the measurable parameters would result in changes in the variable gap of the cavity 166. The cavity 166, therefore, provides an alterable perturbation within the propagating core 164, a perturbation that alters in response to a measurable parameter.

It is preferred that the cavity 166 have a cross-sectional shape that can be compressed and decompressed in response to relatively small changes in the measurable parameter. It is also preferred that the cavity displacements be relatively small, i.e., in the micron and sub-micron range so that the propagation characteristics within the core 164 change a detectable amount, but not an amount that will detrimentally affect the mode profile of a wave propagating within the core, 164. In the examples of FIGS. 4 and 5, an elongated rectangular profile is used for the cavity 166. The cavity 166 has a first side 170 longer than a second side 172. The cavity 166 has dimensions on the order of the wavelength(s) to propagate within the fiber 160. The steady state cavity profile (e.g., at atmospheric pressure) can be changed depending on the desired sensitivity and the parameter to be measured.

Changes to the shape of the cavity 166 will alter the propagation characteristics within the core 164. In particular, a wave traveling within the core 164 experiences a particular index of refraction within the core 164. A fiber core is typically characterized by a material dependent index of refraction. A wave propagating within the core 164 experiences an effective index of refraction that is dependent upon the various materials that the wave propagates through. A propagating wave has an electric field that passes primarily through the core 164 and cavity 166 but also extends substantially into the cladding 162. The energy stored in the electric field is thus dependent on the refractive indices and geometries of the three regions, and the energy stored in the electric field determines the velocity of propagation of the electromagnetic wave along the length of the fiber 160. The propagating wave thus behaves as though it is traveling through a uniform material with an effective index of refraction that is a geometry weighted average of the indices of refraction of the three regions. The effective index of refraction experienced by a propagating wave changes with changes to the geometry, i.e., compression or expansion of the cavity 166. Described now are some exemplary applications in which the change to the effective index of refraction of a wave propagating in a core can be used in an optical sensor.

Figure 6:
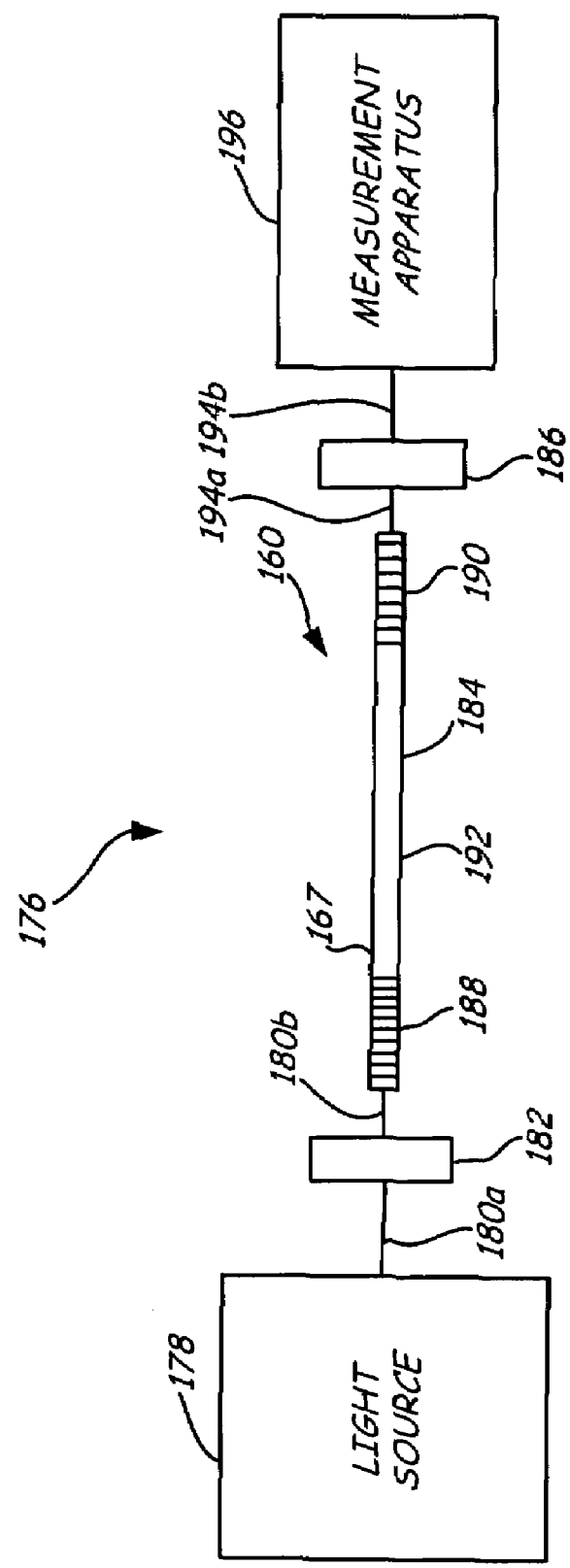
FIG. 6 is an illustration of the optical fiber of FIG. 4 used in an optical sensor in accordance with an embodiment.

FIG. 6 shows the fiber 160 of FIGS. 4 and 5 in a optical sensor 176. The structure may also be considered an apparatus of modulating laser signal frequency. The depicted configuration is similar to that of the laser system of FIG. 1. The optical sensor 176 has a light source 178 supplying an output to the fiber 160 through an isolator 182 and couplers 180A and 180B. Preferably, a semiconductor laser or LED source is used as the light source 178. The source 178 could be a continuous-wave laser or a pulse mode locked laser, though in the latter case the optical medium forming the fiber 160 is not a lasing medium. The fiber 160 is doped to form a lasing material, and the output from the source 178 is a pump energy of a wavelength sufficient to allow lasing action in the fiber 160.

The fiber 160 has a middle portion 184 over which changes to a measurable parameter are measured. A first end of the fiber 160 has a first reflector in the form of Bragg reflector 188 and a second end has a second reflector in the form of Bragg reflector 190. The middle portion 184 extends between the Bragg reflectors 188 and 190 and coincides with the sensing surface 167. The Bragg reflectors 188 and 190 define a resonator 192 within the optical fiber 160. In the depicted environment, the resonator 192 extends along the length of the optical fiber coinciding with the middle portion 184 and extending slightly into the Bragg reflectors 188, 190. In the preferred embodiment, the cavity 166 (not shown) does not extend into the Bragg reflectors 188, 190. However, the cavity 166 may extend into the Bragg reflectors 188, 190 if desired. Though shown as Bragg reflectors 188 and 190, the first and second reflectors could alternatively be mirrors or other highly reflective structures formed on the fiber 160 or external thereto.

In operation, the pump energy produced by light source 178 is supplied to the resonator 192 through the partially transmitting Bragg reflector 188. A laser signal emits from the Bragg reflector 190 along couplers 194A and 194B and through isolator 186. The laser signal has a wavelength corresponding to a resonance frequency of the resonator 192. The frequency of the signal on coupler 194B is measured by a measuring apparatus 196.

Upon a change to a measurable parameter at the sensing surface 167, specifically over the middle portion 184, the cavity 166 will be altered and thereby alter the effective index of refraction experienced by a signal propagating within the core 164. The effective index of refraction will determine the velocity of propagation of the light wave in the resonator 192. This in turn will determine the resonant frequency of the resonator 192 and, therefore, the frequency of the laser signal on coupler 194A in CW operation. In mode-locked operation, the repetition rate is altered. Changes to a measurable parameter will be detected by the detector 196 in the form of changes in the frequency of the laser signal.

In CW operation of the sensor 176, the measurement apparatus 196 is a detector in which the laser signal frequency is compared to the frequency of a reference laser to allow for the measurement of very fine changes to the frequency of the laser signal. In pulse mode operation, the measurement apparatus 196 is an electronic detector that measures changes in the repetition rate of the laser signal pulse train. In either case, cavity displacements of a micron or below will result in frequency changes that can be measured by the detector 196. Though not shown, a CPU or other processor is used to compute a value for the measurable parameter based on the detected laser signal frequency. Changes in measurable parameters are detectable as well as absolute measurements. It would be understood, that an initial normalization may be used to calibrate the detector 196 and/or processor for accurate measurements the measurable parameter. For example, a normalization may be performed before a different measurable parameter is to be sensed. It would be further appreciated that multiple sensors can be used with a processor to make varying sorts of other measurements, like measuring AP between two separate locations within a flow system. With a typical gage factor of 0.01 to 0.1 and a Q of 160 or more measurements with 0.01% to 0.001% resolution may be made with the sensor 176.

Figure 7:
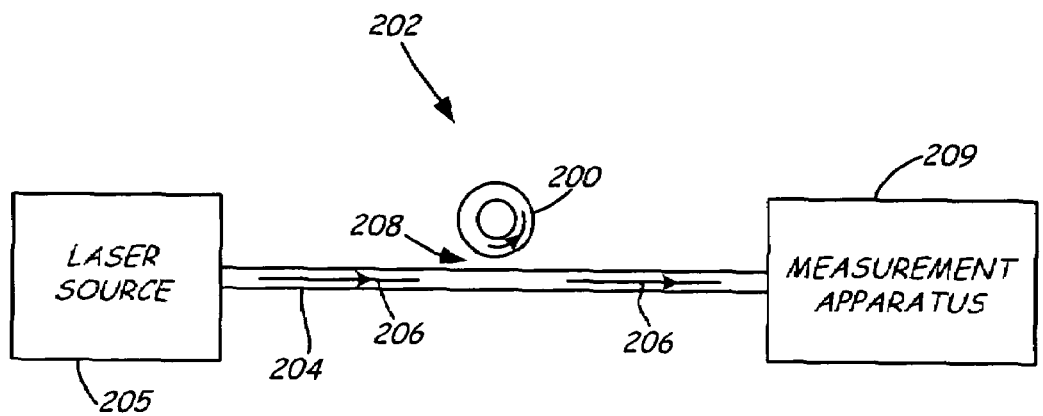
FIG. 7 is an illustration of a ring resonator in accordance with an embodiment.

Alternative resonators are contemplated. An example of an alternative resonator is shown in FIG. 7. Here, a waveguide 200 forms a circular resonator also known as a circulator or ring resonator and will be termed as such henceforth. The ring resonator 200 may be formed by joining ends of a optical fiber using commercially available fusing techniques in the preferred embodiment. The ring resonator 200 has a cladding, core region, and cavity like those of the optical fiber 160 when viewed in cross-section. The ring resonator 200 is characterized by high Q and high gage factor and forms part of an optical sensor 202. If the cavity extends the entire length of the ring resonator 200, then the entire outer surface of the ring resonator 200 would act as a sensing surface.

Coupling of a signal into the closed loop of the ring resonator 200 is achieved through evanescent coupling. A primary waveguide 204 is brought within evanescent coupling contact of the ring resonator 200 over a region generally shown by reference numeral 208. The waveguide 204 is an optically transparent waveguide formed, for example, of a polysilicon material. Sapphire and quartz would also be useful for creating total internal reflection propagation and the waveguide could be another optical fiber. A laser signal 206 from laser source 205 is made to propagate through the waveguide 204.

The signal 206 locks onto the resonant frequency within the resonator 200 and has a narrow bandwidth induced by the coupling into the resonator 200. The signal 206 therefore is dependent upon the properties with the resonator 200, i.e., it is dependent upon a measurable parameter at an outer surface of the resonator 200. Signal 206 is provided to a measurement apparatus 209, such as those described above. It is noted that in one embodiment the ring resonator 200 may be formed from a lasing material such that the resonator constitutes the laser cavity such as shown in the internal resonator embodiment of FIG. 2.

Figure 8:
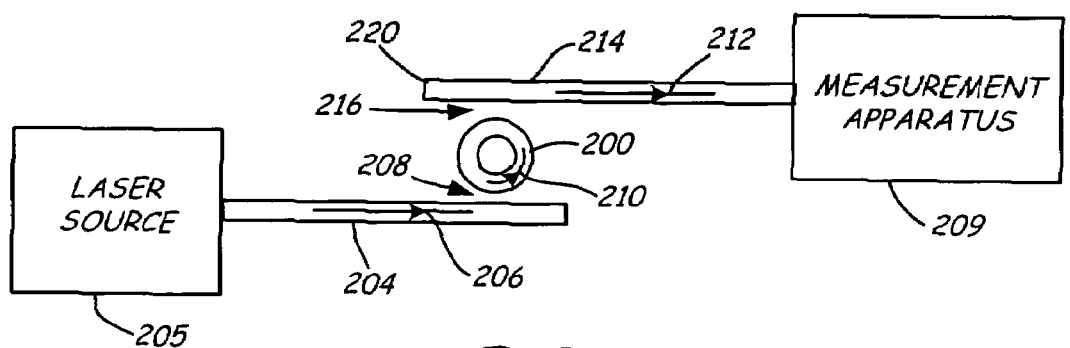
FIG. 8 is an illustration of a ring resonator in accordance with another embodiment.

An alternative embodiment is shown in FIG. 8, in which a signal 210 propagating with the resonator 200 is coupled as signal 212 to a secondary or output waveguide 214 that is within coupling contact with the ring resonator 200 over a region generally shown as 216. This embodiment is particularly useful where the resonator 200 is formed of a non-lasing material. The output waveguide 214 is outside of coupling contact with the waveguide 204. To direct the signal 212, the waveguide 214 has a snubbed end 220 and extends distally therefrom, so that the signal 212 propagates in a parallel direction to that of the signal 206. The signal 212 is coupled to the measuring device 209. The ring resonator 200 and waveguides 214 and 204 are preferably created during the same overall process to reduce device cost and fabrication times.

The embodiment of FIG. 8 may be particularly useful in filtering out a wavelength from an incoming signal. For example, with signal 206 as a broad bandwidth LED energy or a white light energy, the resonator 200 would remove that part of the propagating energy coinciding with the resonance frequency and bandwidth of the resonator 200. The signal 212 would be at the removed frequency. With resonator 200, near complete removal of the resonant frequency from the signal 206 is achievable.

FIG. 9 shows a suitable alternative embodiment to FIGS. 4 and 5 of a fiber 300 having a cladding region 302, a core 304 and a cavity 306. The outer surface 308 is the sensing surface of the fiber 300. The cavity 306 defines a variable gap similar to that of the cavity 166 in that the cross sectional profile of the gap changes in response to changes in measurable parameters. Here, however, the cavity 306 is disposed entirely within the cladding region 302. The cavity 306 is nonetheless close enough to the core 304 to change the effective index experienced by a signal propagating therein. As with the above embodiments, changes to the cavity 306 induced by changes in measurable parameters would alter the effective index. Thus, the fiber 300 can be used in a resonator or laser cavity to produce an output signal that is dependent upon measurable parameters. The fiber 300 is suitable for use in the Bragg reflector resonator or the ring resonator configurations described above, as well as other resonator configurations. As with the fiber 100, the core 304 would be formed of higher index optically transparent material, preferably transparent in the infrared region. The core 304 and the cavity 306 can have different cross sectional profiles and still achieve the desired dependency of the resonant frequency upon changes in the measurable parameters.

Figure 10:
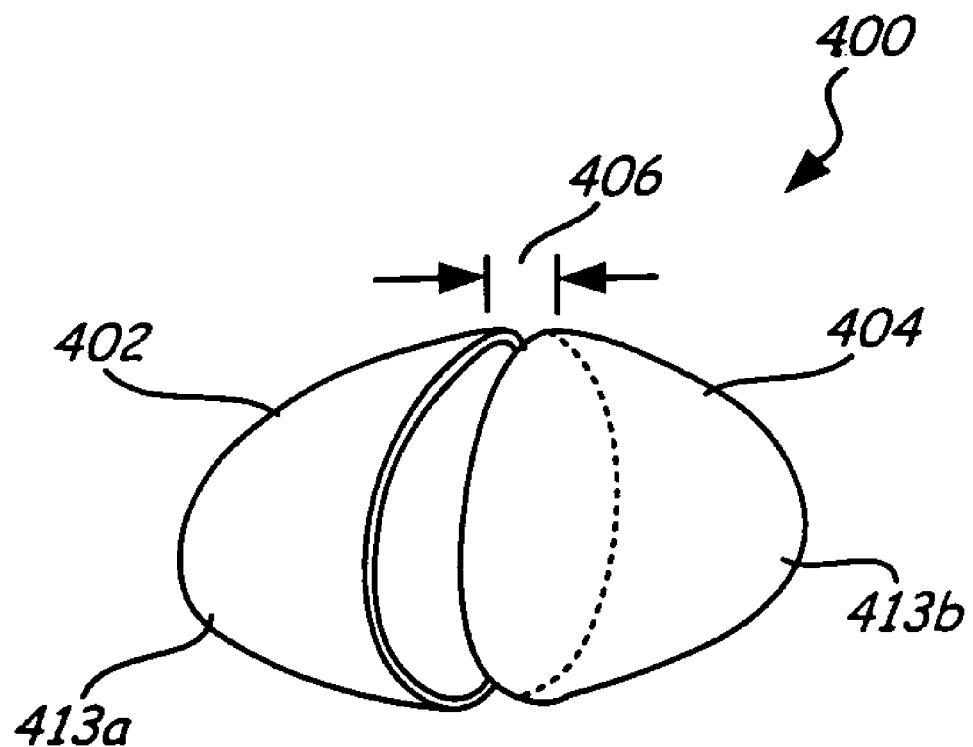
FIG. 10 is an illustration of a microsphere resonator in accordance with an alternative embodiment.
Figure 11:
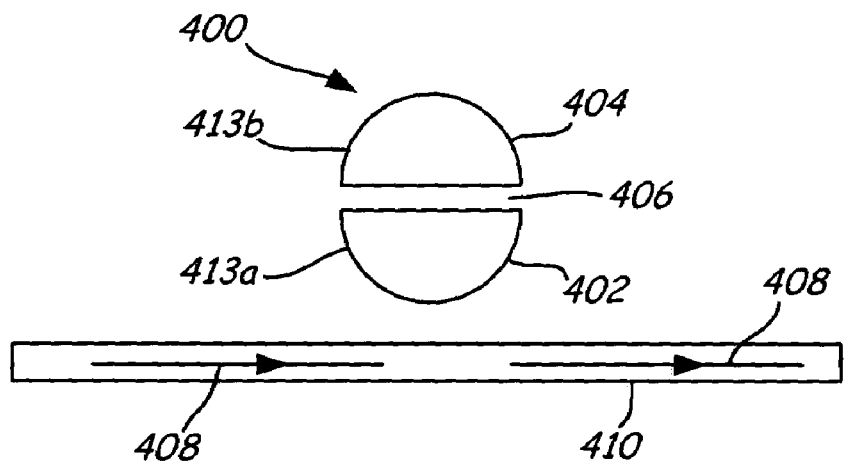
FIG. 11 is an illustration of the microsphere resonator of FIG. 10 in an exemplary optical sensor.
Figure 12:
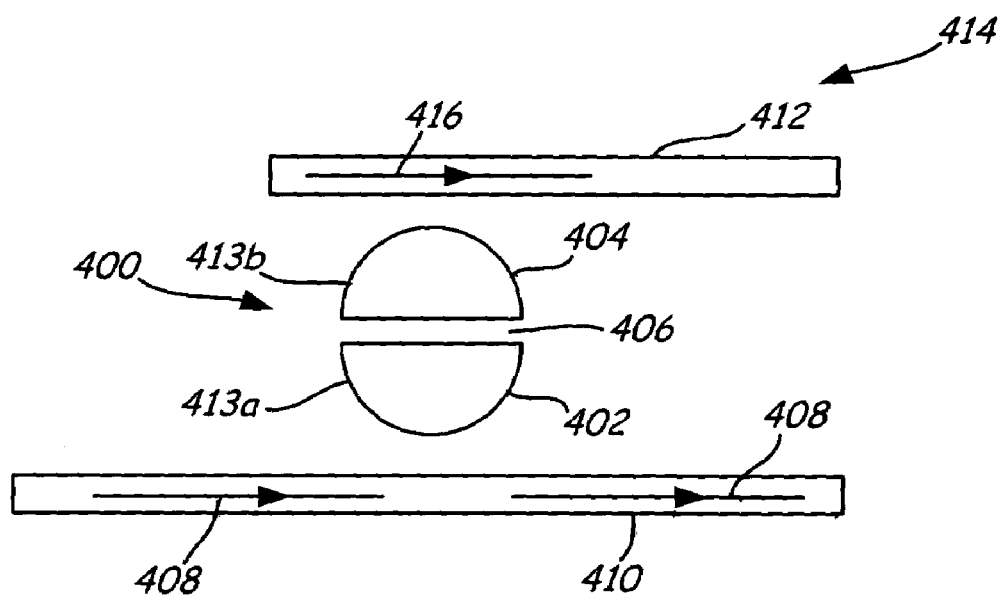
FIG. 12 is an illustration of the microsphere resonator of FIG. 10 in another exemplary optical sensor.

Another type of resonator encompassed within the present teachings is a microsphere resonator such as resonator 400 shown in FIGS. 10-12. Optical microspheres are known to have exceedingly high Q values, exceeding 1,000,000,000. Microspheres, therefore, provide an ideal resonator for measuring very small changes in a measurable parameter. Known microspheres, however, are formed of unitary structures without gaps or spacings that can be made to vary.

The microsphere 400 is hollow and operates in a whispering gallery mode where light travels along the outer surface of the microsphere 400 like known microspheres. Light is confined by total internal reflection at the surface of the sphere. The microsphere 400 is separated into a first hemisphere 402 and a second identical hemisphere 404, and the two hemispheres 402, 404 are separated by a variable gap 406. The gap 406 is small enough such that a signal propagating within either of the hemispheres 402, 404 will be able to couple into the other for propagation therein.

The microsphere 400 is characterized by a resonant frequency defined by the hemispheres 402 and 404. The spacing of the gap 406 affects the resonant frequency in a similar manner to that of cavity 166 on fiber 160. Referring to FIG. 11, a portion of a laser signal 408 propagating in waveguide 410 is coupled into hemisphere 402. The laser signal 408 will lock onto the resonant frequency within the high Q resonator 400. In operation, as a measurable parameter changes at sensing surface 413A and/or 413B, the variable gap 406 will vary the spacing between the hemisphere 402 and the hemisphere 404 and thereby alter the resonant frequency of the microsphere 400. The resulting variation in the variable gap 406 alters the output frequency of the laser signal 408. The signal 408 is coupled to a measuring apparatus, not shown.

FIG. 12 shows an alternative embodiment, in which the microsphere 400 is disposed between two waveguides 410 and 412, and the microsphere 400 functions as a resonant frequency filter or sensor 414 similar to the structure shown in FIG. 8, producing a filter laser signal 416 in waveguide 412.

The microsphere 400 and waveguides 408 and 410 may be formed over a substrate and mounted using mounting means suitable for ordinary microspheres. The hemispheres 402 and 404 are preferably mounted for movement relative to one another. By way of example, MEMS mounting structures may be used for this purpose. A MEMS fabrication process could be used to create an actuation mounting that biases the hemispheres 402 and 404 to a desired variable gap spacing, but that will allow the variable gap spacing to contract and expand in response to small changes in pressure, temperature, etc. The microsphere 400 is preferably formed of a lasing material, like doped quartz. Though, it may be formed of a nonlasing material instead. Multiple microspheres may be used to increase the signal to noise ratio of the output signal measured at the detector. Other modifications will be apparent.

Figure 13:
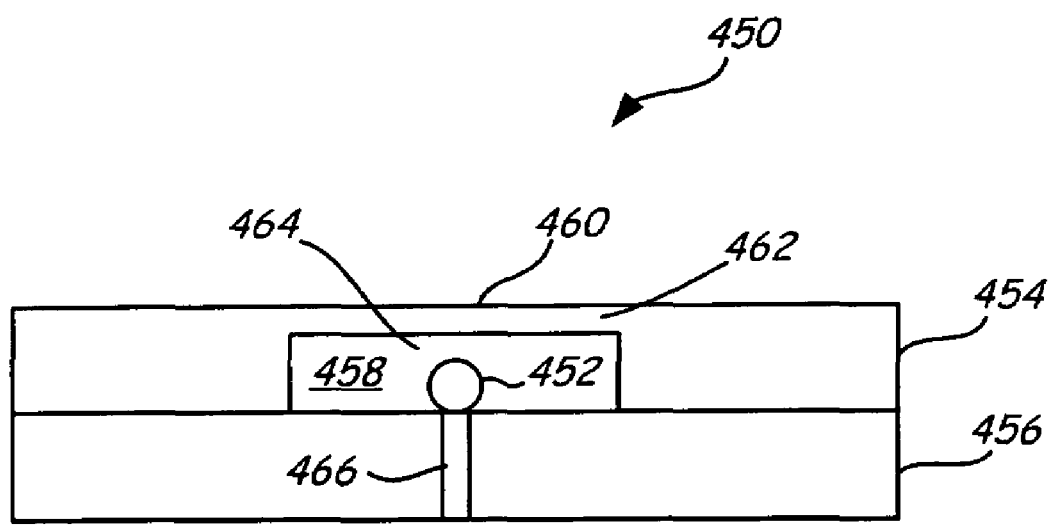
FIG. 13 is a cross-sectional view of an alternative optical sensor having a microsphere.

FIG. 13 shows an alternative optical sensor 450, in the form of an optical sensor capsule, formed with a microsphere 452. In the preferred embodiment, the laser is doped to form a microlaser which lases when excited by pump light. The sensor 450 is comprised of two modules 454 and 456. The first module 454 is formed of a dielectric material and contains a receiving cavity 458. The module 454 has a sensing surface 460 disposed above a flexible membrane or portion 462, such that changes in a measurable parameter at the sensing surface 460 will deflect the membrane 462. The module 456 is formed of a dielectric material and is disposed in contact with the microsphere 452. For example, the microsphere 452 may be disposed in a small spot indentation in the module 456. The microsphere 452 could be supported by a pedestal. The microsphere 452 is preferably a unitary structure and not formed of halves like the embodiments of FIGS. 10-12. The microsphere 452 is positioned below the membrane 462 and collectively the two define a variable gap 464, In this configuration, light is coupled into the microsphere 452 and changes in the variable gap 464, i.e., changes due to changes in the measurable parameter at the sensing surface 460, will affect the resonance condition in the microsphere 452, thereby changing the frequency of a laser source in CW operation or changing repetition rate of a pulsed laser source in mode-locked operation. By way of example, a waveguide 466 is shown for coupling light in and out of the microsphere 452. Alternatively light could be coupled to the microsphere 452 through the transparent module 454 by focusing a light beam unto the microsphere 452.

The ring resonator embodiments like those of FIGS. 7-8 may be formed integral to a substrate, thereby providing a unitary structure protecting the resonator and waveguides from damage. An exemplary integrated optical sensor 500 is shown (unassembled) in FIG. 14 having a first module 502 and a second module 504. The first module 502 includes a ring resonator 506 formed using an implantation, an etch and growth, or other suitable processes. In a preferred embodiment, the substrate 508 is formed of sapphire and the ring resonator 506 is formed of gallium arsenide or polysilicon which have higher indices of refraction than sapphire and thus provide total internal reflection. A primary waveguide 510 and a snubbed secondary waveguide 512, similar to the waveguides described above with respect to FIG. 8, have also been formed in the substrate 508. The waveguides 510 and 512 and the ring resonator 506 have top surfaces flush with the top surface 514 of the substrate 508. Signals propagating with the waveguides 510 and 512, as well as the ring resonator 506, do so under total internal reflection.

Figure 14:
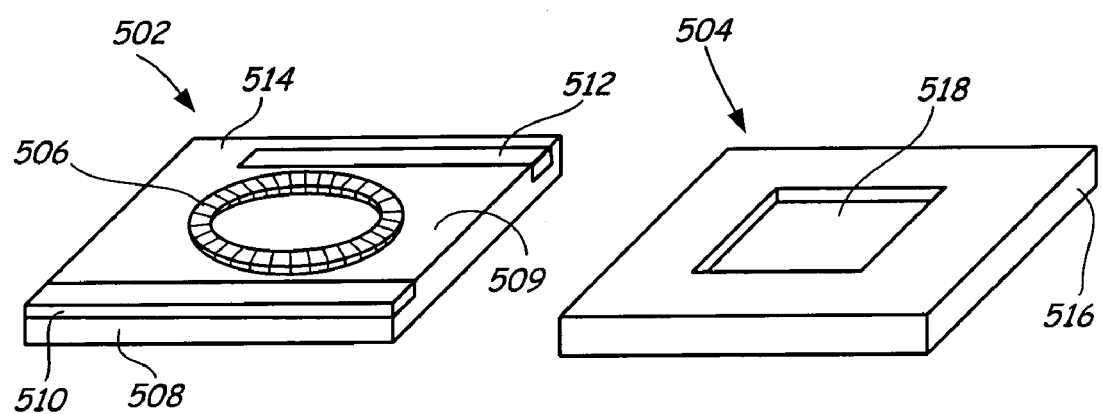
FIG. 14 is a perspective view of an unassembled integrated optical sensor with first module and second module in accordance with an embodiment.

The module 504 is formed of a substrate 516 which in the preferred embodiment would be the same material as that of substrate 508. Module 504 includes a cavity 518 defining a variable gap. As with the cavity 166 previously described, the cavity 518 has a geometry such that the gap of the cavity 518 will vary in response to changes to a measurable parameter, like pressure, force or temperature. Furthermore, while a rectilinear shape is shown in FIG. 14, it will be understood that other shapes are suitable; for example, a non-planar shape may be used. The integrated optical sensor 500 is formed by mounting module 504 on module 502 forming the structure shown in FIG. 15.

Figure 15:
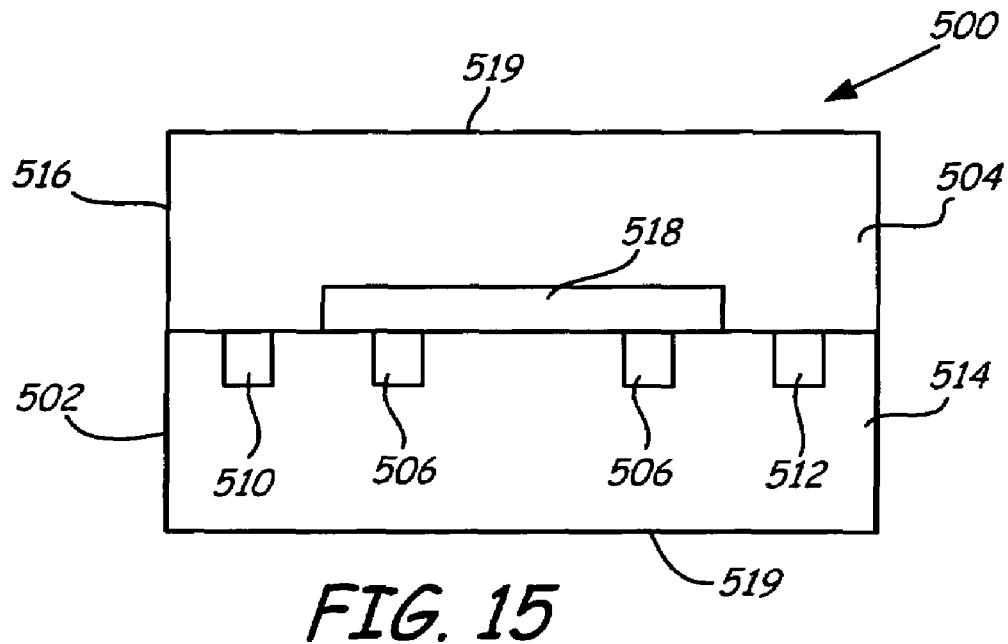
FIG. 15 is a cross-sectional view of the integrated optical sensor of FIG. 14 assembled.

As shown in cross-section in FIG. 15, the cavity 518 is external to the ring resonator 506, but close enough to alter the effective index of refraction experienced by a wave propagating within the ring resonator 506. The shape of the cavity 518 is altered in response to changes to the measurable parameters described above at sensing surfaces 519, and variations in the variable gap change the resonant frequency of the resonator 506. The module 504 may, for example, form a diaphragm above the resonator 506. The output signal on waveguide 512 is coupled to a detector and processor. The configuration could be used in a CW or pulse mode operation in accordance with the above teachings.

Numerous alternatives to the optical sensor 500 will be apparent to persons of ordinary skill in the art. For example, a Bragg grating may be formed on a surface of the resonator 506 to further narrow the bandwidth of the output signal from waveguide 512 or otherwise affect operation. The ring resonator 506 could be doped to provide integral lasing action or the ring resonator 506 could be coupled to an external laser to provide a variable frequency output. Additionally, concentric ring resonators may be used, for example, to compensate for temperature fluctuations. This alternative is particularly useful as each of the concentric ring resonators would have different pressure sensitivities due to differing geometries (in this case radii).

Figure 16:
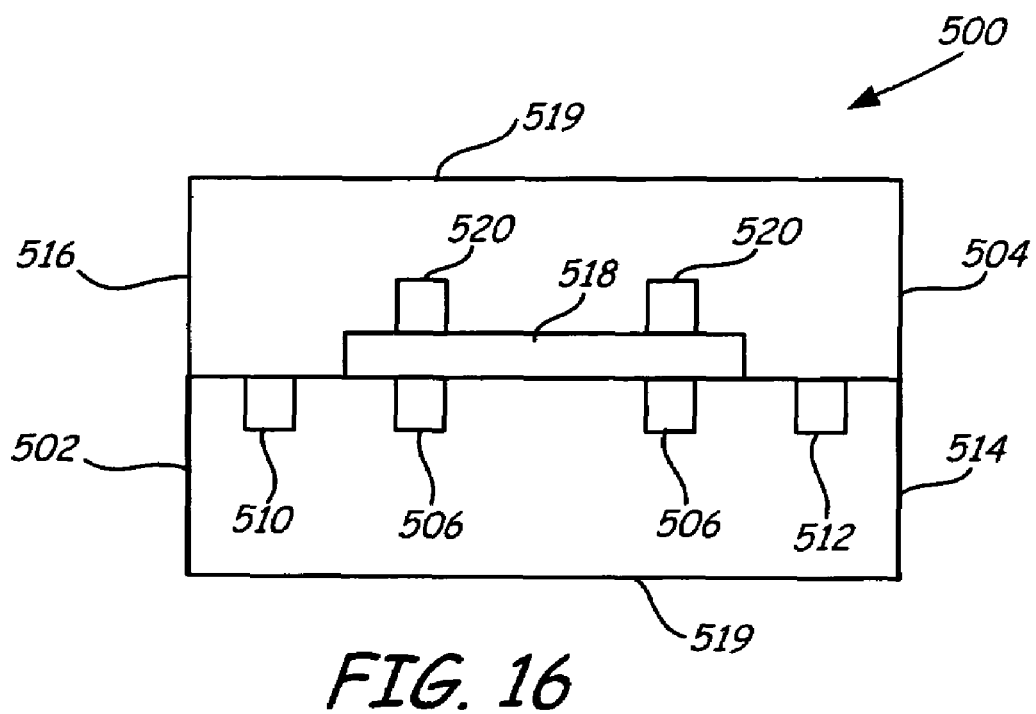
FIG. 16 is a cross-sectional view of the an alternative integrated optical sensor to that shown in FIG. 15.
Figure 17:
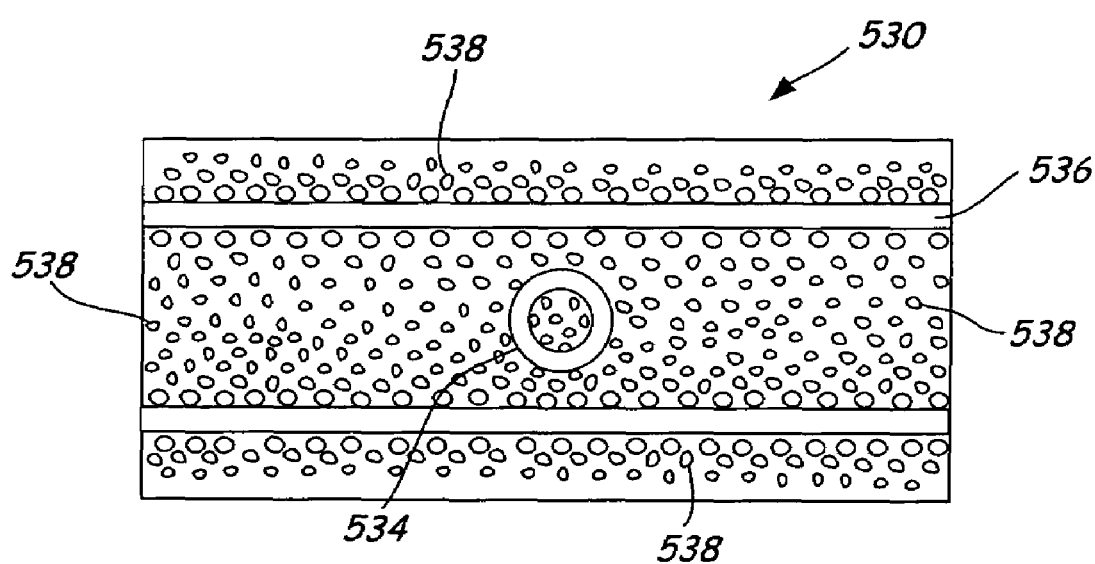
FIG. 17 is a top view of an alternative to the first module of FIG. 14 using a photonic crystal array to form a resonator.

Even further, the optical sensor 500 could be formed of symmetrical and identical opposing ring resonators existing on opposite sides of the cavity 518. The two waveguides would act as a single mode waveguide with a variable internal gap. FIG. 16 shows the cross-section of an embodiment in which a second ring resonator 520 is disposed above the cavity 518 and over the ring resonator 506.

Alternative to the two module structure shown in FIG. 14, the optical sensor 500 can be formed in a single substrate structure, i.e., without modules. Here, multiple step processing may be employed in which a first portion of a substrate layer is grown and then implanted or etched processed to form the integral ring resonator and necessary waveguides and then a subsequent growth stage would be performed to form the cavity on the top surface of the sensor, The first module 502 is alternatively formed of a photonic crystal module 530 in FIG. 17. The module 530 has a primary waveguide 532, a resonator 534, and a secondary waveguide

536. The module 530 may be used with the module 504, as an alternative to module 502, or the module 530 may be formed with a variable gap cavity in a unitary structure. The resonator 534 is formed by a change in the spacing in the photonic crystal array as is known in the art.

The waveguides 532, 536 and the resonator 534 are formed in a 2D photonic crystal lattice array. A photonic crystal generally consists of a repetitive array of elements where the dimensions for each element are similar to or on the order of the wavelengths of light to propagate within the array. Photonic crystals are desirable because they have tight mode confinement and low losses even with sharp corners in the waveguide. They also allow for evanescent coupling. As a result, the module 530 is a low loss optical coupler, and the resonator 534 is a high Q resonator.

The module 530 is formed with a 2D array of holes or posts 538 configured in a triangular lattice orientation. The array may be formed using known photonic crystal formation techniques. For example, collimated optical beams may bore holes through an optical substrate material. Lithographic processes by which electron beams directly write the patterns to be etched in thin membrane or heterostructures are also known. The formed 2D photonic crystal array defines the resonator 534 as well as the waveguides 532, 536 and therefore a single processing step may be used to form these three structures simultaneously.

In the module 530, a laser signal propagating within the primary waveguide 532 will evanescent couple into the resonator 534, a ring resonator. As with the other resonators described herein, the resonator 534 may be formed of lasing material or non-lasing material. The signal from the resonator 534 is coupled to the waveguide 536. The module 530 is preferably used with the external cavity 518, where changes to the sensing surface 519 will alter the variable gap of the cavity 518 and the frequency of the resonator signal from the resonator 534.

Though the embodiments shown in FIGS. 14-17 show a primary, or input, waveguide and a secondary, or output, waveguide, it will be understood that a single waveguide may be used as in FIG. 7.

Figure 18:
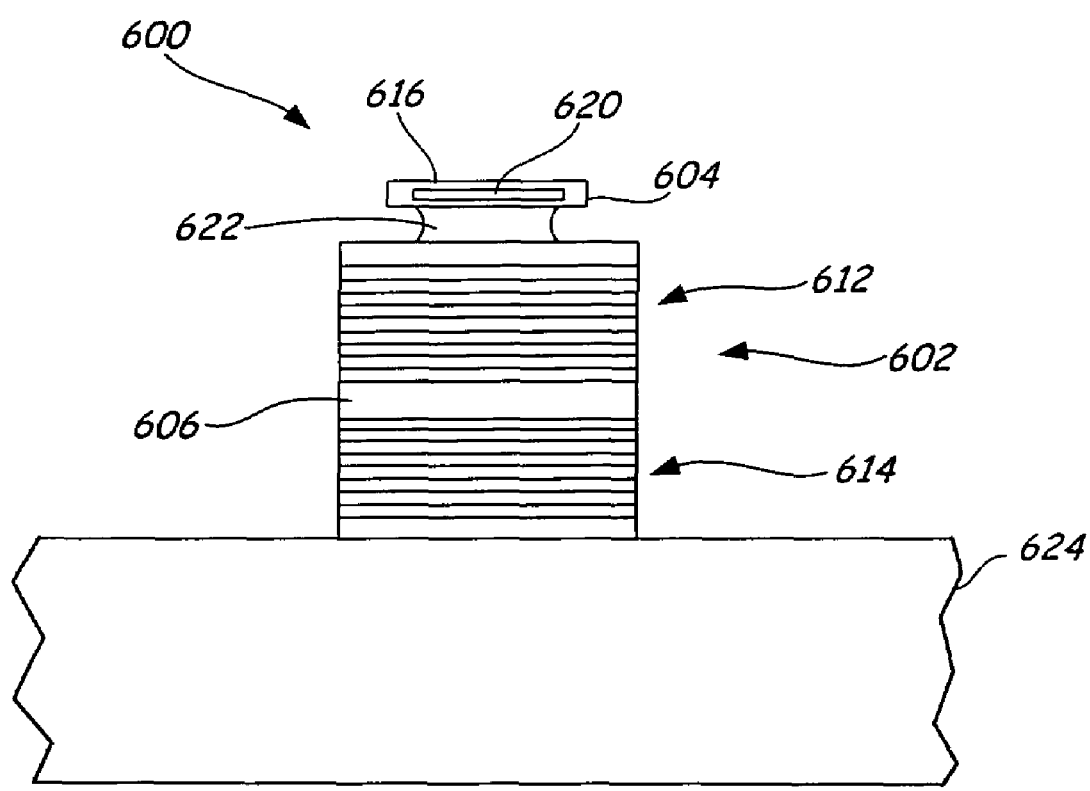
FIG. 18 is a cross-sectional view of a microdisc resonator and VCSEL in accordance with an embodiment.

FIG. 18 shows another embodiment of an optical sensor 600. The optical sensor 600 is formed of a vertical cavity surface emitting laser (VCSEL) 602 having an output coupled to an external resonator 604. The VCSEL 602 exemplarily includes an active region 606 and two reflectors 612 and 614, each being distributed Bragg reflector layers in the preferred embodiment. The resonator 604 is a microdisc resonator operating on the principle of total internal reflection and thus has low losses and a high Q. The resonator 604 has a cavity 620 defining a variable gap that varies in response to changes in a measurable parameter at a sensing surface 616. The resonator 604 is mounted to the top surface of the VCSEL 602 for receiving the output from the VCSEL 602. By way of example, a transparent dielectric 622 is shown for this purpose. The entire sensor 600 could be mounted on a substrate or support layer 624 for easy packaging and placement in existing applications.

In this embodiment, the output from the resonator 604 depends upon the resonant frequency thereof. The resonant frequency is a function of the variable gap of the cavity 620 and that variable gap is a function of the measurable parameters like pressure and temperature. The VCSEL output is coupled to the high Q microdisc 604 to determine the frequency of the VCSEL 602.

As can be seen from the foregoing, a high Q optical resonator with a resonant frequency that is dependent upon a measurable parameter such as pressure, temperature, flow rate, force, material composition, or strain is shown. The resonant frequency of the resonator determines the output frequency of a laser, by having the laser lock onto the resonant frequency, or the resonant frequency may determine the output of a resonator acting as a filter. The output of either is dependent upon the measurable parameter at a sensing surface and can be used to calculate an absolute or differential value for the measurable parameter. The resonator may be formed of an optical medium external to a laser or light source or the optical medium may be internal to the source making the laser cavity the resonator. Numerous waveguides are described above including dielectric resonators like the microdisc and microsphere that rely only upon total internal reflection, as well as resonators that do have waveguides for confining propagating signals. In addition to those shown, other resonator structures will be apparent.

Numerous applications for these teachings have been described above and yet others will be apparent. The high accuracy of the described optical devices is well suited for industrial process and flow system applications, particularly those with low signal strengths where conventional electronic based semiconductor sensors often do not work. In one application, an optical remote pressure sensor could be used where the optical resonator replaces an oil filled capillary tubing. Another application includes AP flow meters where pressure is measured in physically separated locations, and a meter is used to determine the change in pressure. In contrast, conventional AP sensors require an oil filled isolator system to couple the two physically separated pressures to a common sensor. The optical sensors are also suitable for pressure measurement in high temperature applications where conventional sensors and electronics do not operate, for example, measuring pressure in jet engines, measuring pressure in oil wells and measuring steam. The structures shown could also be used in AP transmitters where the AP must be measured at high line pressure (AP). Here dual AP optical sensors with high sensitivity could be used. Even further, temperature measurement applications where conventional wiring is not suitable due to electrical interference or safety considerations can now be achieved through the use of all optical sensors. Other sensor applications include using optical sensors to measure flow rate and material composition.

Figure 19:
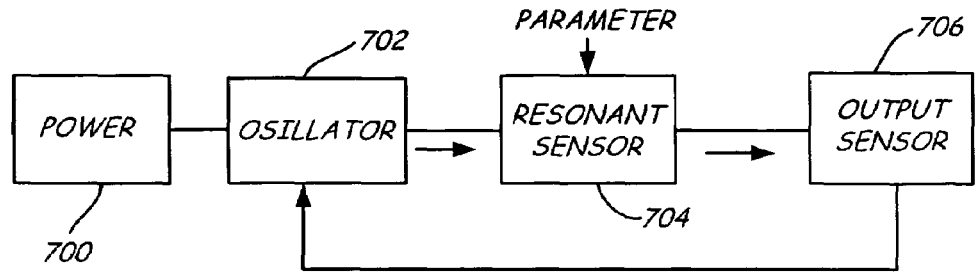
FIG. 19 is a block diagram of electromagnetic high Q dielectric resonant sensor driven by a microwave oscillator.
Figure 20:
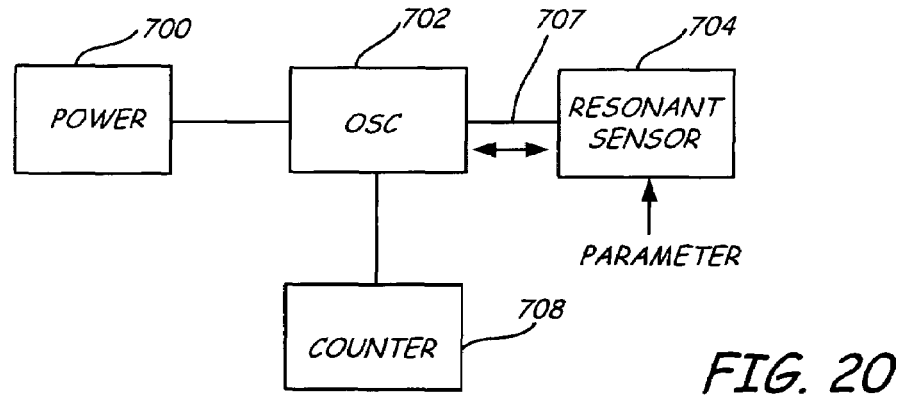
FIG. 20 is a block diagram of a sensor system having a microwave oscillator and a high Q dielectric resonant sensor in a self-resonant configuration.
Figure 21:
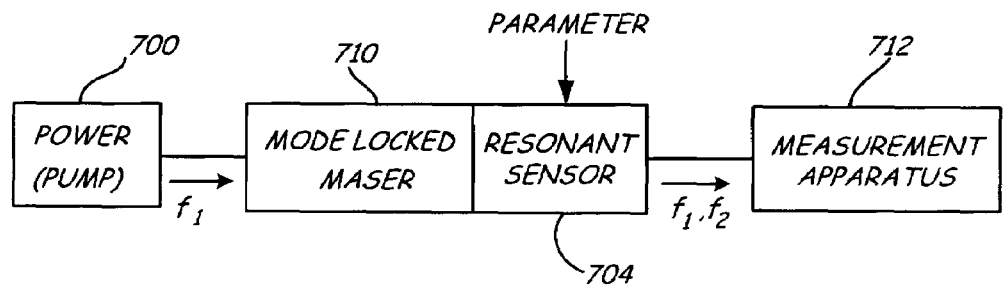
FIG. 21 is a block diagram of a sensor system having a maser in conjunction with a high Q dielectric resonant sensor.

FIGS. 19-38B show embodiments of the high Q resonant sensor operating at frequencies in the microwave portion of the electromagnetic spectrum (i.e. the suboptical portion of the spectrum including microwave and terahertz frequencies). FIGS. 19-21 show block diagrams of exemplary sensing systems, while FIGS. 22A-38B show embodiments of high Q dielectric resonant sensors usable with microwave or exitation.

FIG. 19 shows sensing system including power source 700, oscillator 702, high Q dielectric resonant sensor 704, and output sensor 706. Power source 700 provides electrical power or electromagnetic wave energy to oscillator 702. The output of oscillator 702 is high frequency electomagnetic radiation in the microwave portion of the spectrum. For simplicity in description, the electromagnetic wave energy used in the embodiments shown in FIGS. 19-21 will be referred to as "microwave" energy.

The microwave output of oscillator 702 is supplied through a microwave coupling or transmission line (such as a coaxial cable or waveguide) to high Q dielectric resonant sensor 704. As will be discussed in more detail with reference to FIGS. 22A-38B, dielectric resonant sensor is a body of dielectric material having an internal cavity which changes geometry in response to a measurable parameter, such as pressure, differential pressure, temperature, force or the like. The cavity defines a gap which changes size in response to changes in the measurable parameter. Changes in the size of the gap cause a change in the effective dielectric constant encountered by the electric field component of the electromagnetic microwave energy (supplied by oscillator 702) that propagates through sensor 704. The velocity of propagation is a function of the effective dielectric constant, and therefore the resonant frequency of resonant sensor 704 changes as a function of gap size (which is a function of the measurable parameter).

The embodiment shown in FIG. 19, output sensor 706 is coupled to dielectric resonant sensor 704 to receive microwave energy from sensor 704. As frequency of microwave energy supplied from oscillator 702 is swept through a range of frequencies, output sensor 706 detects when the input microwave energy is at the resonant frequency of dielectric resonant sensor 704. The embodiment shown in FIG. 19, output sensor 706 is connected in a feedback loop to the frequency sweep control of oscillator 702, so that the output frequency of oscillator 702 is adjusted to the resonant frequency of sensor 704. The output frequency of oscillator 702 as sensed by output sensor 706, is representative of the measured parameter.

FIG. 20 shows an embodiment in which oscillator 702 and high Q dielectric resonant sensor 704 arranged in a self-resonant configuration. DC power from source 700 powers oscillator 702 which supplies microwave energy over two-way connection 707 to excite resonant sensor 704. Impedance changes in sensor 704 lock oscillator 702 onto the resonant frequency of sensor 704. The oscillator frequency of oscillator 702 is a function of the resonant frequency of sensor 704, and is counted by counter 708 to provide a measure of the measurable parameter.

FIG. 21 shows an embodiment including power source (or pump) 700, maser 710, high Q dielectric resonant sensor 704, and measurement apparatus 712. Power source 700 is a microwave oscillator providing power at a pumping frequency $f_1$. In this embodiment, sensor 704 is either within the cavity of maser 710, or is positioned outside the cavity, and has a resonant frequency $f_2$ that is a function of the parameter to be measured. Measurement apparatus 712 receives the output beam from maser 710, as affected by resonant sensor 704. Measurement apparatus 712 may be a spectrometer that detects the frequency of the maser beam, or may count maser pulses. Both the frequency of the beam, and the repetition rate of the pulses of the beam are functions of the resonant frequency of high Q dielectric resonant sensor 704. Since the cavity geometry (i.e. gap size) and the effective dielectric constant of sensor 704 varies as a function of the parameter, frequency and repetition rate of the maser beam received by measurement apparatus 712 both vary as a function of the measurable parameter.

One example of a maser usable with the present invention is a sapphire (ruby) resonator that can be made to mase at about 32 GHz when excited with a 66.4 GHz pump source. This allows the input parameter sensitive 32 GHz signal from maser 710 and resonator 704 to be easily distinguished by measurement apparatus 712 from the pump frequency produced by source 700. A description of a planar sapphire coupled-cavity maser is shown in J. S. Shell et al., T.M.O. Progressive Report 42-142 (Aug. 15, 2002, at page 17.) The Shell et al. article describes continuous mode masers. Although FIG. 21 shows a single resonant sensor 704 used with maser 710, multiple resonant sensors constructed so that they are tuned a slightly different resonant frequencies close to 32 GHz can also be used.

FIGS. 22A-38B show various embodiments of an electromagnetic resonant sensor which is responsive to pressure (or another parameter to be sensed) and which operates at microwave frequencies. The electromagnetic resonance sensor is a dielectric structure having a cavity gap that changes in response to the parameter being sensed. The dielectric material may be a single crystal material such as sapphire, a dielectric ceramic, a glass, or quartz. In the following discussions, sapphire will be used as an example of the dielectric material forming the body of the electromagnetic resonant sensor. The resonant frequency of the sensor is a function of the square root of the ratio of stored electric field energy to stored magnetic field energy in the dielectric body and cavity gap of the sensor. As the cavity gap changes as a function of the parameter, the effective dielectric constant of the sensor changes. This causes a change in stored electric field energy, and therefore a change in resonant frequency.

The resonant sensor is typically suspended in a metal cavity that is either evacuated, or filled with a fluid such as oil or a gas. Because of the large dielectric constant of sapphire (or other dielectric material) compared to free space (or the gas or oil filling), microwave resonant modes will exist within the dielectric structure that are almost independent of the surrounding cavity. The electromagnetic energy in selected resonant modes will be confined to the internal high dielectric structure as an electromagnetic standing wave within the dielectric body and the cavity gap. Microwave energy can be fed to the structure and impedance changes at resonance can be detected, or the system can be made self resonant. Because of the low dielectric loss of sapphire at microwave frequencies, the Q of the resonant sensor can be very high. Q factors of greater then 100,000 at room temperature and greater then 1,000,000 at cyrogenic temperatures are typical. Dimensions of the resonant sensor are typically in the millimeter to centimeter range to be compatible with microwave wavelengths. Small changes in dimensions of the resonant sensor can be used to tune the resonant sensor over small frequency ranges. The resonant sensor has excellent short-term stability because of the high Q. Long-term stability is excellent because frequency depends only on the stability of the dimensions and the dielectric constant of the dielectric of the resonant sensor body.

Figure 22A:
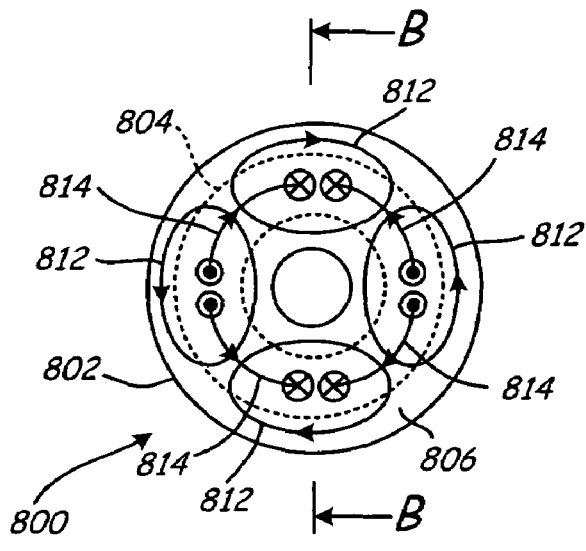
FIGS. 22A and 22B show an embodiment of electromagnetic ring resonator sensor for use with microwave energy in accordance with the present invention.
Figure 22B:
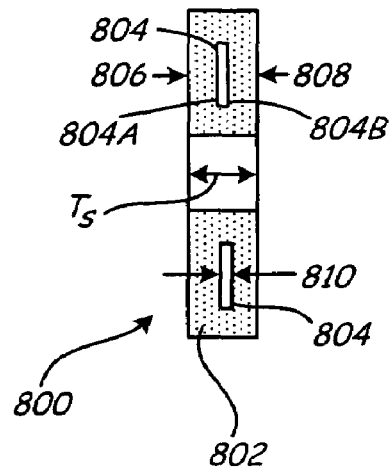

FIGS. 22A and 22B show electromagnetic resonant sensor 800 that operates at microwave frequencies. Sensor 800 is a ring or toroidal shaped dielectric body 802 with an internal ring-shaped cavity or chamber 804. Faces 806 and 808 of body 802 are responsive to a parameter to be measured, such as pressure applied through a oil fill medium that surrounds sensor 800. The pressure causes a deflection of the walls of body 802 inward, which causes a change in gap 810, which is defined by the distance between interior surfaces 804A and 804B of cavity 804.

Sensor 800 is operated in a whispering gallery mode, which provides a high gage factor in conjunction with a high Q. This structure provides a high Q at room temperature, since modes are available in which the internal electromagnetic radiation is totally reflected at the interface between dielectric body 802 and the surrounding medium. This mode is similar to the acoustic whispering gallery in which sounds are transmitted with very low loss around the periphery of a circular chamber.

By interrupting the electric field component of the electromagnetic standing wave within body 802 with variable gap 810 (which has lower dielectric constant than dielectric body 802), a relatively high gauge factor can be achieved. An oil fill medium can be used to transfer pressure to faces 806 and 808 in order to change the geometry of cavity 804, and particularly to change the thickness of the pressure sensitive gap. Since the dielectric constant of the oil is significantly lower than the dielectric constant of body 802, a high Q resonance that is relatively independent of the oil dielectric properties can be maintained. Microwave power can be coupled to sensor 800 by simply introducing microwave energy into the surrounding oil medium, or by coupling the microwave energy into discontinuities in dielectric body 802, such as a small hole or projection. Also, microwave energy can be transferred to dielectric body 802 by placing the center conductor of a coaxial cable close to or in contact with body 802.

FIG. 22A shows sensor 800 operating in a fourth order mode, with an electromagnetic standing wave having four magnetic field loops 812 and four electric field loops 814. The mode shown in FIG. 22A has maximum pressure sensitivity, since electric field loops 814 pass through gap 810 of cavity 804. If electric field loops 814 and magnetic field loops 812 are transposed, frequency will have minimum pressure sensitivity, and sensor 800 can be used for temperature sensing purposes. In that case, resonant frequency will depend on the dielectric constant of the sapphire, which is temperature dependent.

The number of loops shown in FIG. 22A is by way of example. Resonant mode with other numbers of loops can be accommodated. High order modes generally have higher Q and higher resonant frequencies.

Electromagnetic resonant modes are based on distributed rather than lumped effects, and the structures are complex. Exact solutions are difficult to obtain, but approximations can be made using rough lumped constants. The electromagnetic standing wave pattern will consist of interlocking looped magnetic and electric fields. In the ring resonator structure shown in FIGS. 22A-22B, the pattern is a circular loop linked chain with alternate horizontal and vertical links representing electric and magnetic fields. By interrupting the electrical field loops with variable gap 810, a change in the measurable parameter effectively changes capacitance of an LC resonator. The resonant frequency will thus change since F=K/SqrtLC. In a conventional capacitance sensor, all of the capacitance will be confined to the gap since the conducting plates do not support internal capacitance. In the structure shown in FIGS. 22A-22B, on the other hand, energy is also stored in the electric field within the sapphire so that a significant part of the total lumped capacitance is fixed and the gage factor will be reduced. This will be compensated for by the increased stability and signal to noise ratio of the resonator. Roughly:

$$C_t \cong \frac{C_S + C_g}{C_S C_g} \text{ where } C_s \propto \frac{\epsilon_S A_S}{L_S} \text{ and } C_g \propto \frac{\epsilon_0 A_g}{X_g}$$

Where $C_s$ is capacitance due to sapphire and $\epsilon_s$ is sapphire dielectric constant and $A_s$ is effective area of electric field in sapphire and $L_s$ is effective length of electric field in sapphire and $C_g$ is capacitance due to gap 810 and $\epsilon_o$ is dielectric constant of vacuum and $A_g$ is effective area of gap 810 and $X_g$ is the size of gap 810.

An alternate approach is to examine the effective wavelength of the standing wave electromagnetic field. In general the smallest dimension will determine the effective wavelength. If an air (or vacuum) gap is inserted in the electric field loop in a high dielectric material it will effectively increase the wavelength by a ratio equal to the ratio of the dielectric constants of the dielectric material and the gap.

The embodiment illustrated in FIG. 22A-22C, approximate operating frequencies and gage factors can be calculated, depending upon the ring thickness $T_s$, the pressure sensitive gap $X_o$, and the maximum deflection or change in the gap $\Delta X$. When $\Delta X$ is 0.5 mil, $X_o$ is 1 ml, $\epsilon_s$ is 10 and $T_s$ is 50 mil, the approximate operating frequency is 40 GHz.

$$f \cong \frac{c}{\lambda \sqrt{\epsilon_s}} \cong 40 \text{ GHz}$$

Where $\lambda \cong 2T_s \cong .25 \text{ cm} \cong .0025 \text{ m}$

The approximate gage factor GF is 0.1.

$$GF \cong \frac{1}{2}\frac{\Delta X_s}{T_s}\frac{\epsilon_s}{\epsilon_0} \cong \frac{1}{2}\frac{\Delta X}{X_0}\frac{\epsilon_s}{\epsilon_0}\frac{X_0}{T_s} \cong \frac{1}{2}\frac{10}{1}\frac{1}{50} \cong 0.1$$

Figure 23A:
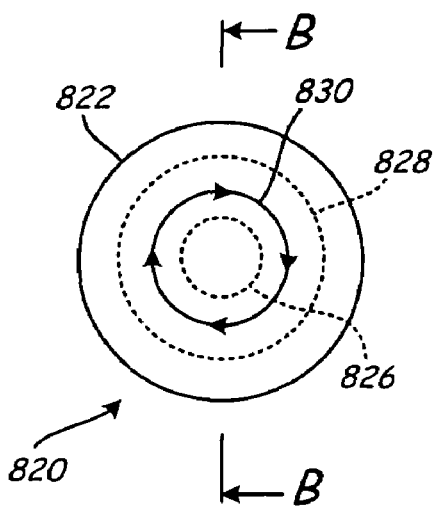
FIGS. 23A and 23B show an embodiment of an electromagnetic ring resonator sensor with a cavity of two different gap thicknesses.
Figure 23B:
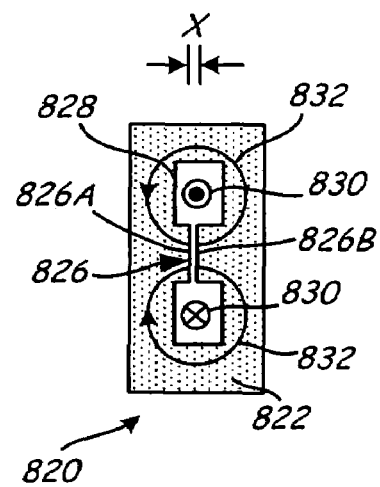

It may be desirable to lower the resonant frequency for a given size sensor in order to reduce power and to increase compatability of the sensor with semiconductor circuitry. One way of accomplishing lowered resonant frequency is to use a sensor design that is intermediate between a lumped LC circuit and a waveguide. FIGS. 23A and 23B show sensor 820, which has such a configuration.

Sensor 820 is a cylindrical dielectric body 822 with internal cavity 820 divided into two zones: central zone 826 and surrounding zone 828. Central zone 826 is thinner and presents a pressure responsive variable gap between interior surfaces 826A and 826B.

FIGS. 23A and 23B show magnetic field loop 830. Electric field loop 832 is shown in FIG. 23B. As shown in FIGS. 23A and 23B, the electric field predominates in zone 826 and represents a capacitance which varies as the variable gap X changes in response to pressure. The magnetic field predominates in zone 828 and represents and inductance. In essence, sensor 820 is a single turn toroidal inductor coupled to a capacitance.

Figure 24A:
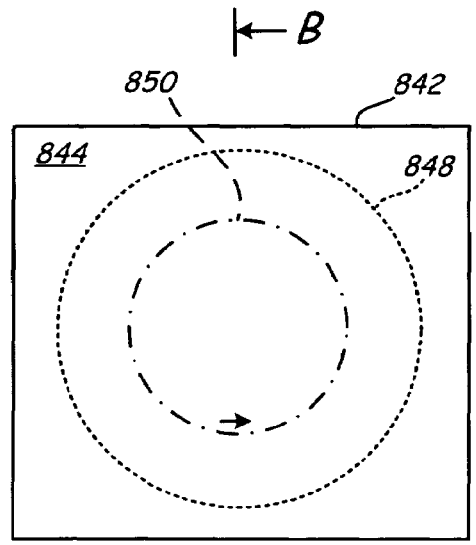
FIGS. 24A and 24B show an embodiment of an electromagnetic ring resonator sensor having square faces and a circular cavity operating at a lowest resonant mode.
Figure 24B:
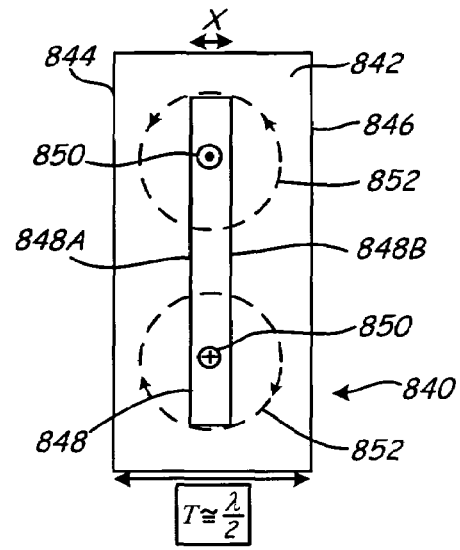

FIGS. 24A and 24B show another embodiment of a dielectric resonator sensor in accordance with the present invention. Sensor 840 is a generally rectangular block of dielectric material 842 having a generally square front and rear faces 844 and 846 and a circular cylindrical internal cavity 848 with a variable gap X defined by interior surfaces 848A and 848B. The thickness of body 842 is approximately one-half wavelength of the resonant frequency sensor 840. FIGS. 24A and 24B illustrate sensor 840 operating at the lowest resonant mode, with a single magnetic field loop 850 and a single electric field loop 852.

Figure 25A:
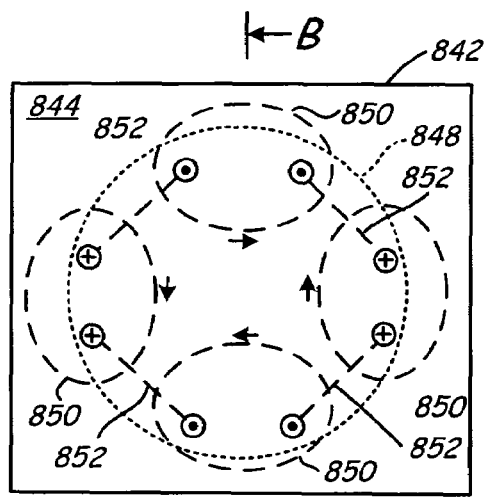
FIGS. 25A and 25B show the ring resonator sensor of FIGS. 24A and 24B operated at a higher resonant mode.
Figure 25B:
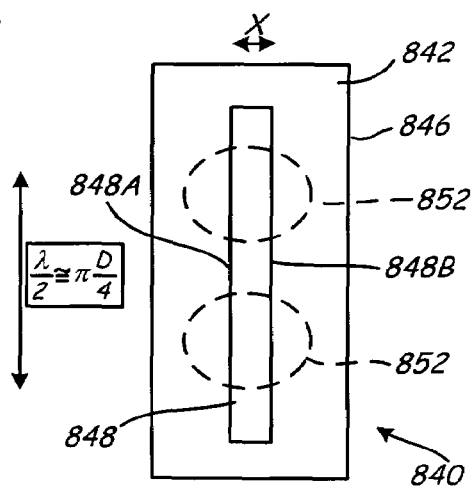

FIGS. 25A and 25B illustrate sensor 840 operating in a higher resonance mode, with higher Q and higher resonant frequency. In this embodiment, resonance is established in a whispering gallery mode with a standing wave which consists of a link chain of magnetic field loops 850 and electric field loops 852, with an effective diameter D. The wavelength λ is given by the following relationship:

$$\frac{\lambda}{2} \cong \frac{\pi D}{4}$$

Figure 26A:
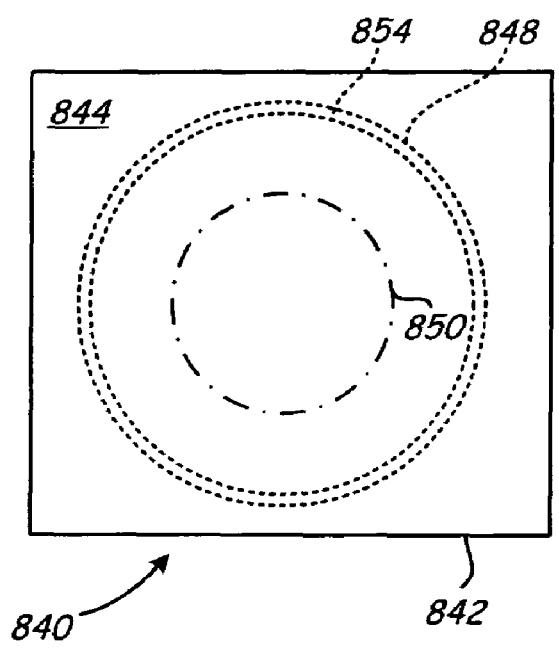
FIGS. 26A and 26B show a ring resonator having a conductor on one surface of the cavity.
Figure 26B:
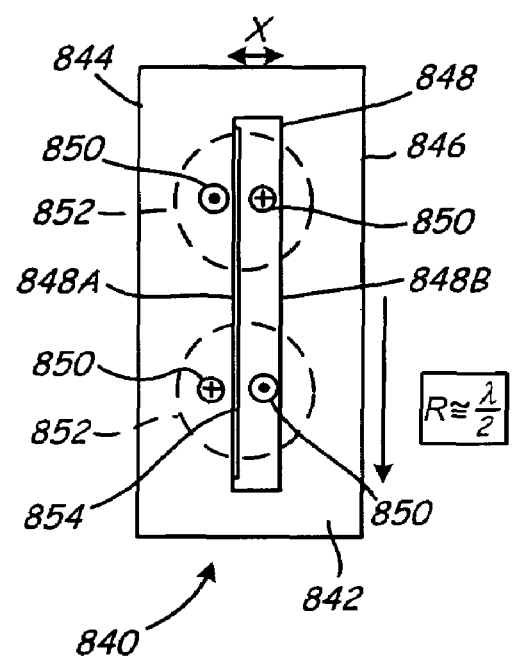

Other forms of resonant sensor using the present invention have resonant transmission line or resonant antenna configurations. FIGS. 26A and 26B show a resonant antenna embodiment of sensor 840 in which conducting film 854 has been added to one side of internal cavity 848 to reduce the operating frequency of sensor 840. A half wavelength of the resonant frequency is approximately equal to the radius of conducting film 854. Magnetic field loop 850 and electric field loops 852 of the electromagnetic standing wave are shown. Sensor 840 acts as a resonant circular antenna.

Figures 27A, 27B:
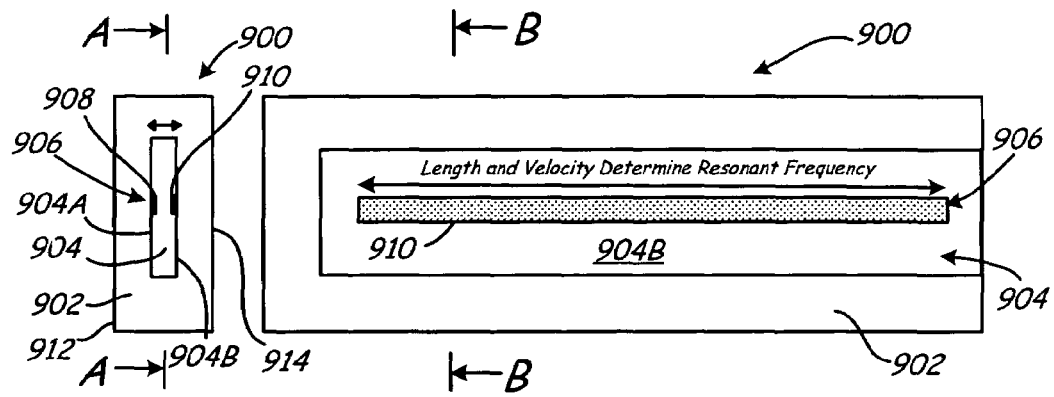
FIGS. 27A and 27B show sectional views of an embodiment of a resonant transmission line sensor having conductors on opposing surfaces of a cavity.

FIGS. 27A and 27B show a resonant transmission line sensor 900, which includes dielectric body 902 with cavity 904 and transmission line 906 located within cavity 904. Transmission line 906 is formed by conductors 908 and 910, which are positioned opposite one another on opposing walls 904A and 904B of cavity 904.

In the embodiment shown in FIGS. 27A and 27B, transmission line 906 is a strip dual transmission line. The speed of propagation down transmission line 906 will depend on the energy stored in the electromagnetic field, which is a function of the gap spacing between surfaces 904A and 904B of cavity 904. If transmission line 906 is terminated either open or shorted, there will be an associated resonance which will also vary as the gap X of cavity 904 changes. This resonance can be sensed to indicate pressure applied to outer faces 912 and 914 of sensor body 902.

For a given sensor size, the resonant frequency of resonant transmission line sensor 900 is lower than the operating frequencies of the resonant sensors having shown in FIGS. 22A-25B a resonant cavity with no electrodes. A lower operating frequency has the advantage of greater compatibility with solid state electronics. Conversely, for a given operating frequency, the sensor can be smaller and thus lower cost.

Other configurations are possible. Both conductors 908-910 can be located on the same side of cavity 904. Transmission line 906 can fold back and forth in order to lower the operating frequency even further. Conductors 908 and 910 can be separated physically and capacitively coupled before being brought through a feedthrough so that the resonance is primarily determined within cavity 904. External coupling electrodes can be used to sense the resonance. In still another embodiment, a single conductor can be used with an external ground to form a coaxial type resonator.

The resonant frequency of sensor 900 is determined by the velocity of propagation on transmission line 906 and its length $$f = \frac{V}{\lambda} = \frac{V}{2L}$$

where V is propagation velocity and λ is the wavelength of the standing wave, and the mode is a resonant half wavelength transmission line with both ends shorted or open. The propagation velocity in this structure is a function of the average or effective dielectric constant through the electromagnetic wave energy is traveling. Sensor 900 is configured so that the standing wave is confined such that a significant percentage of its total energy is stored in the gap. The remainder of the energy is stored in the sapphire which has a dielectric constant of about 10 times the dielectric constant in the gap. Under these circumstances $$V = \frac{1}{\sqrt{\mu_0 \overline{\epsilon}}} = c\sqrt{\frac{\epsilon_0}{\overline{\epsilon}}}$$

where c is the speed of light, and $\epsilon_0$ is the dielectric constant of the vacuum, and $\overline{\epsilon}$ is the energy averaged dielectric constant that the electromagnetic wave is exposed to. Thus the propagation velocity will vary from approximately c/3 when the gap is totally closed to a value approaching c when the gap is very large. The resonant frequency will also change by a 3:1 ratio since it is directly related to velocity. For a practical design the change will be smaller than this but a gage factor of 0.1 to 0.5 is probably reasonable.

Q (or quality factor) is an important factor in a resonant circuit since it determines the sharpness of the resonance and thus determines how accurately the resonant frequency can be determined. Q should be much larger than 1 for a practical device. Q is an inverse measure of the energy losses is the system. Most of the losses will occur in the resistance of the metal films creating the conductors. Losses in the sapphire and gap dielectric will be low, and shielding can prevent energy loss due to radiation. The geometry will determine the relationship between Q and the film resistivity.

Figures 28A, 28B:
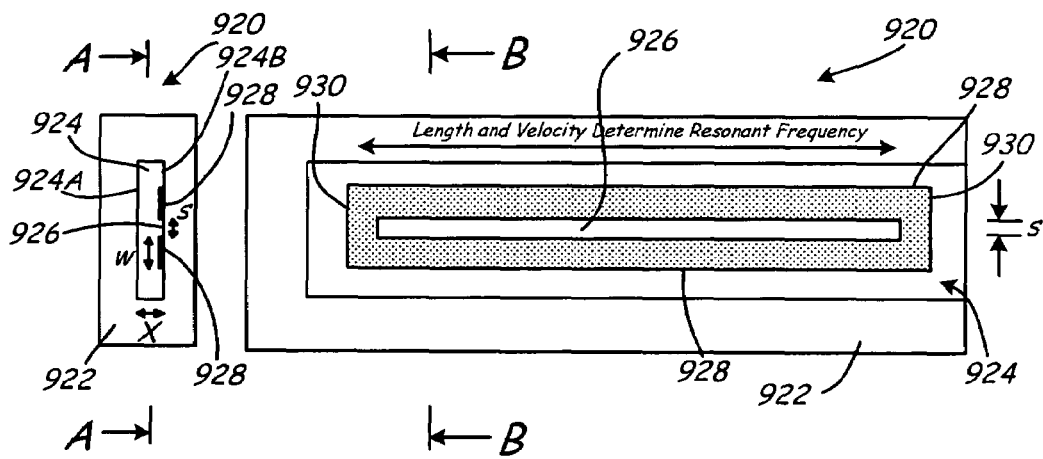
FIGS. 28A and 28B show sectional views of an embodiment of a resonant transmission line microwave sensor having a slot antenna in a conductor on one surface on the cavity.

FIGS. 28A and 28B show another embodiment of the invention—resonant transmission line sensor 920. Dielectric body 922 has an internal cavity 924 with a pressure responsive variable gap X between interior surfaces 924A and 924B. Positioned within cavity 924 is slot antenna 926. The width of the major conductive lines 928 forming slot antenna 926 is W, and the spacing between the two major conductive lines is S.

When the distances between conductive lines 928 is about equal to the relative dielectric constant of sapphire times cavity gap X, the sensor 920 will have a reasonable gage factor in combination with a reasonable Q. The width W of the lines 928 can be varied to optimize the Q versus the gage factor. When they are very wide, the structure resembles a resonant slot more than a transmission line but the principle of operation is very similar. In both cases charge resonates back and forth between the facing central portions of the two lines 928. It does this via a current flow around closed ends 930 that connect lines 928. Q can be estimated as follows:

$$Q = \frac{T}{2\pi R_e C_e} \cong \frac{8T}{\pi R_t C_t}$$

where T is the period of oscillation and $R_e$ is the effective resistance that charges the effective capacitance of $C_e$ transmission line 926. R and C are distributed and the charging voltages and currents are distributed sinusoidal. Thus the effective values $R_e$ and $C_e$ are less than the total values $R_t$ and $C_t$. Since T is relatively constant for any given line length L, maximizing Q is a matter of finding a structure with a small R in combination with a small C. The edge-to-edge orientation of this structure gives a small capacitance in conjunction with a low resistance. It allows relatively low resistance since the lines can be made wide without appreciably increasing the capacitance. One example of values using the structure of sensor 920 is:

Cavity gap X=6 microns.
Line spacing S=50 microns.
Line width W=200 microns.

Line length L=0.25 cm
Resistivity $R_s$=0.5 ohms/square
V=c/sqrt9=c/3=$10^{10}$ cm/sec
f=V/2L=$10^{-10}$ cm/sec/2*0.25 cm=20 GHz
T=0.5×$10^{-10}$ sec
Rt=# of squares×Rs=28 squares×0.5 ohms/square=14 ohms
$C_t$=2 pf/cm×0.25 cm =5 pf $$Q = \frac{8}{3.14} \frac{5 \times 10^{-10} \text{ sec}}{14 \text{ ohms} \times 5 \times 10^{-12} fd} = 18$$

Higher Q can be obtained by increasing film thickness, or other dipole and slot antenna structures can be used.

Figures 29A, 29B:
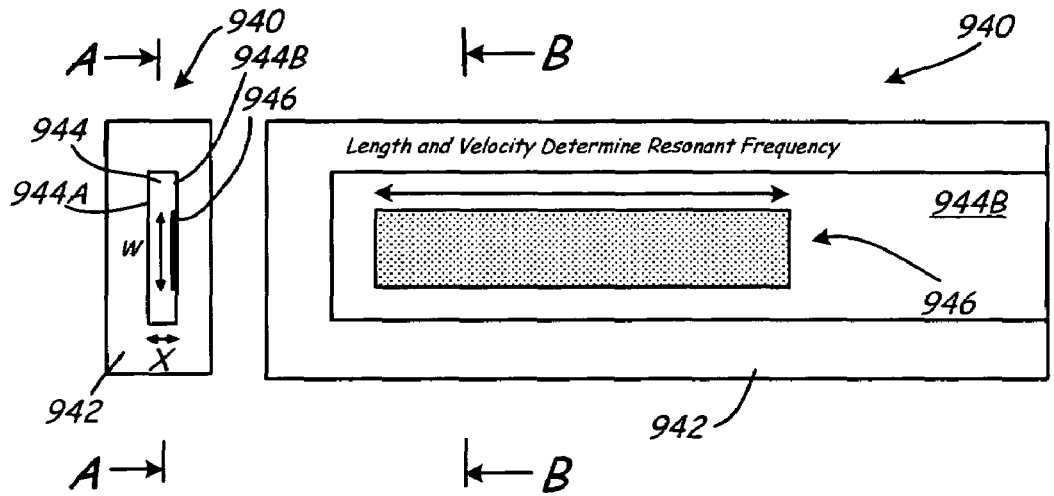
FIGS. 29A and 29B are sectional views of an embodiment of a coaxial resonant transmission line sensor.

FIG. 29A and 29B show sensor 940 having a dielectric body 942, internal cavity 944, and coaxial transmission line 946. Sensor 940 offers a simple structure with a transmission line 946 which can be considered as either a coaxial transmission line with open terminations, or a dipole antenna. Length and velocity determine the resonant frequency. Velocity of the electromagnetic wave along transmission line 946 will depend upon the dimension gap X between surfaces 944A and 944B of cavity 944. The structure shown in FIGS. 29A and 29B have only a few squares of sheet resistance impeding current flow, and thus have higher Q. In addition, the structure shown in FIGS. 29A and 29B tends to have lower capacitance per unit length, which also helps to raise Q.

In the embodiment shown in FIGS. 29A and 29B, capacitance sensitivity of sensor 940 is at a maximum near the ends of body 942. As a result, the antenna 946 should be oriented as shown in FIG. 29A.

Figures 30A, 30B:
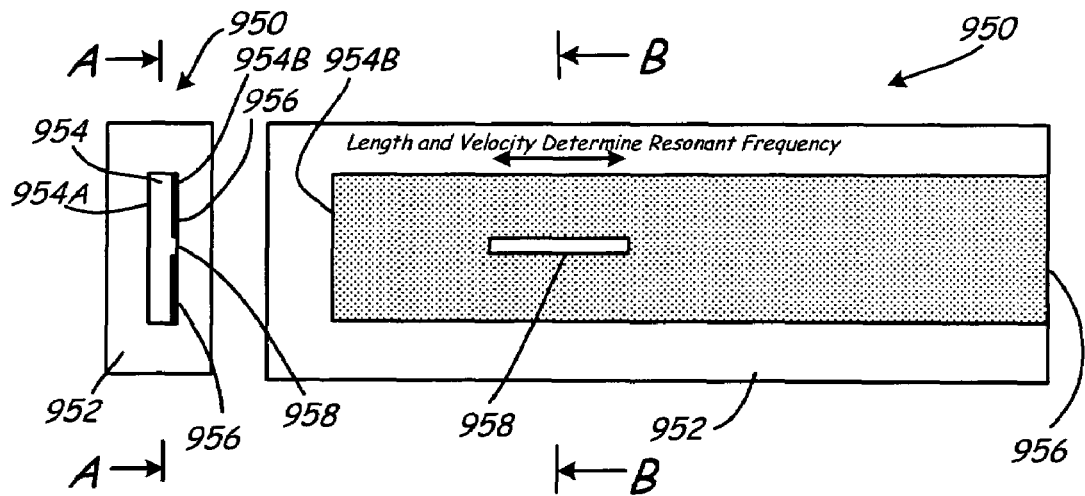

Slot type antennas can also be used in conjunction with the present invention. Examples of resonant sensor 950 with different of slot type antennas are illustrated in FIGS. 30A and 30B, 31A and 31B, and 32A and 32B, 33A and 33B, 34A and 34B, and 35A and 35B. In these figures, resonant sensor 950 has a dielectric body 952, cavity 954 with interior surfaces 954A and 954B defining variable gap X, and conductor 956 on surface 954B. Conductor 956 contains a slot antenna of a different configuration in each FIG. 30A-35A. In FIG. 30A the length of slot antenna 958 and the velocity of the electromagnetic wave energy (which is a function of gap size X) will determine resonant frequency. For maximum Q, slot type antennas have to be relatively short, since current must flow unimpeded around the ends of the slot. This results in correspondingly higher resonant frequencies.

In FIG. 31A, a single vertically oriented slot 960 is shown. The frequency determining length is the vertical length of slot 960.

In FIG. 32A, slot 962, surrounded by a pair of circular cutouts 964 and 966, form a slot antenna. Cutouts 964 and 966 enhance Q by reducing capacitance near the sensitive central area.

FIG. 33A shows a slot antenna formed by five parallel slots 968. This structure has capability of very high Q if it oscillates with alternative polarities on adjacent slots. Current flow should be in a horizontal direction between the slots to minimize the losses.

Figures 34A, 34B:
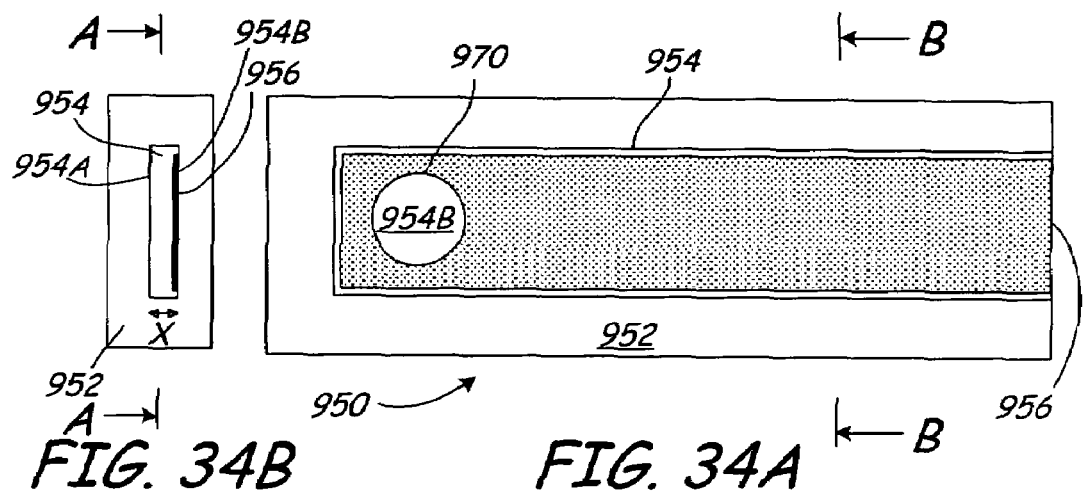
Figures 35A, 35B:
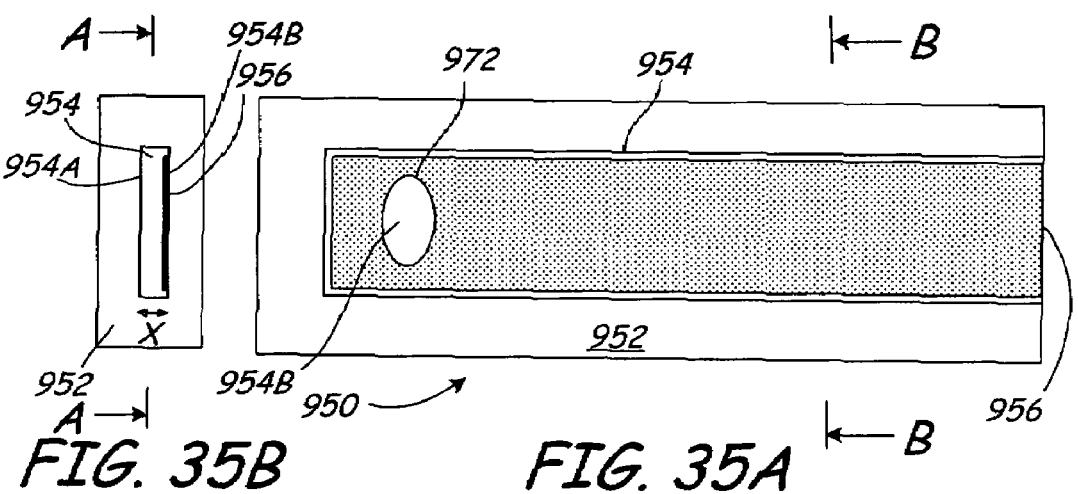

FIGS. 34A and 35A show further embodiments in which slots are "widened" to form port type antennas. FIG. 34A shows circular port 970, while FIG. 35A shows an elliptical port 972.

In variations of the embodiments shown in FIGS. 30A-35B multiple antennas (slot or circular port antennas) can be formed in the conductor resulting in multiple resonant frequencies. The use of different antennas and different lengths in one sensor allows the potential of providing a reference or a temperature signal, along with the signal representing the parameter of interest.

Figures 36A, 36B:
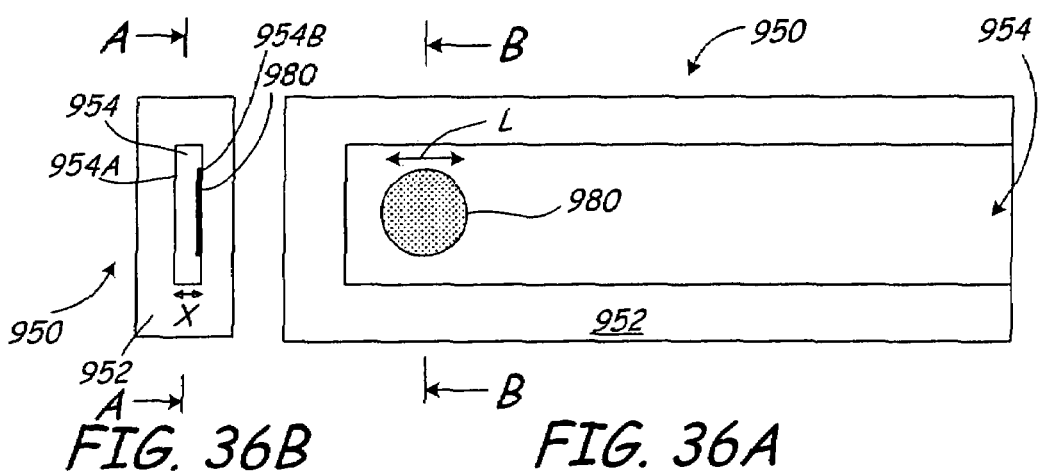
FIGS. 36A and 36B, and 37A and 37B are sectional views of embodiments of circular dipole resonant transmission line sensors.
Figures 37A, 37B:
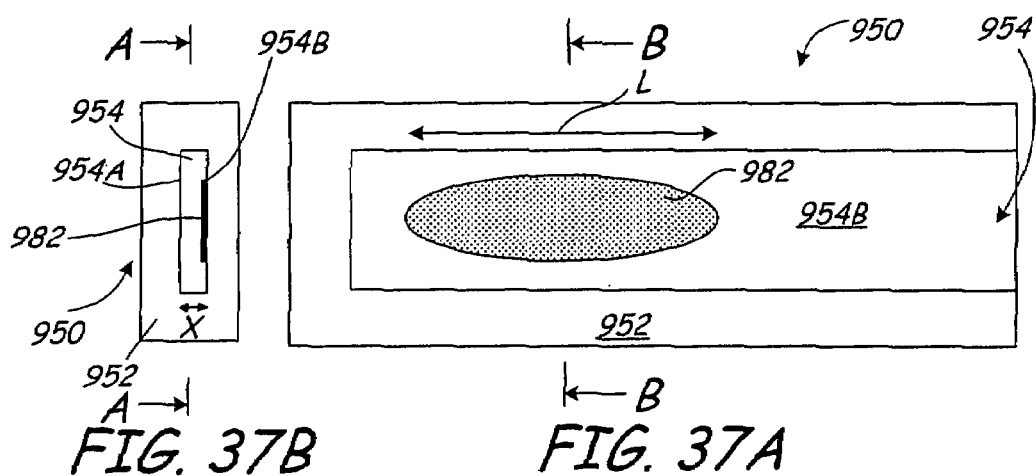

FIGS. 36A and 36B and FIGS. 37A and 37A show two additional embodiments of sensor 950 featuring dipole antennas. Circular conductor 980 is shown in FIG. 36A and elliptical conductor 982 is shown in FIG. 37A. The frequency determining length is in the horizontal direction as shown in FIGS. 36A and 37A.

Figures 38A, 38B:
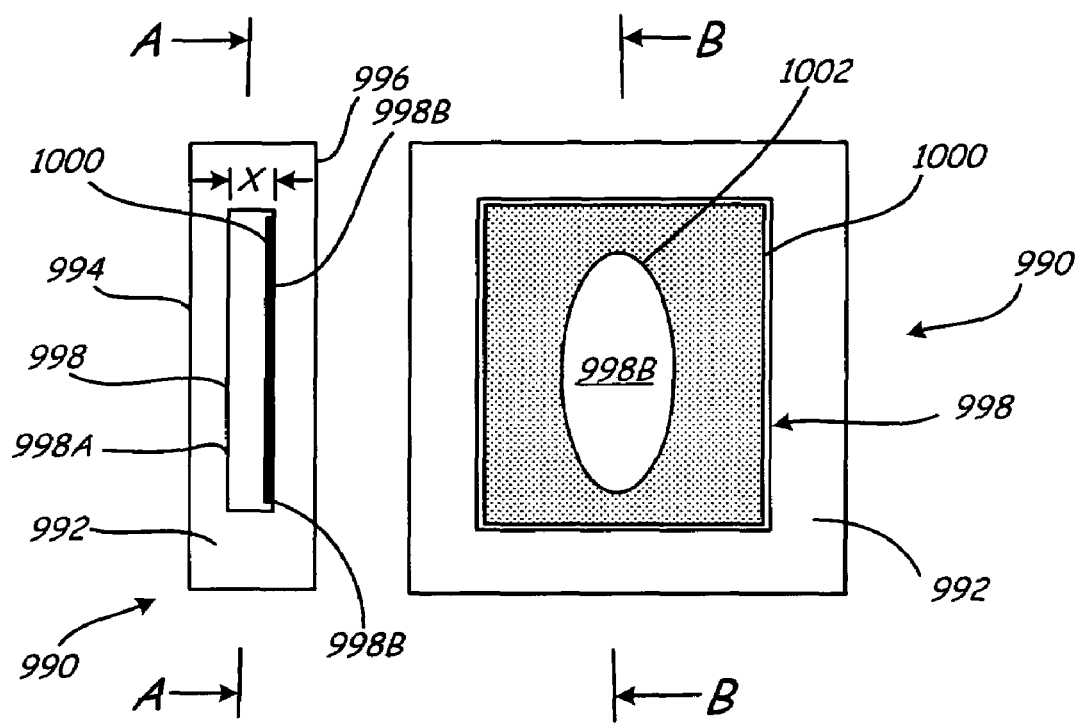
FIGS. 38A and 38B are sectional views of a high Q resonator sensor having a rectangular cavity with a rectangular conductor and a circular port antenna.

FIGS. 38A and 38B show still another embodiment of a sensor having a resonant antenna. Sensor 990 has a dielectric sensor body 992 with square front and real surfaces 994 and 996 with a square internal cavity 998 defining variable gap X between interior surfaces 998A and 998B. Conductor 1000 is formed on 998B wall of cavity 994 and has an elliptical opening 1002 which forms a port antenna.

As illustrated in FIGS. 19-38B, resonant sensor is operating with microwave oscillators can be used to sense various parameters, so long as the parameter causes a change in the cavity gap of the resonant sensor. In general, the size of the device is operating at microwave frequencies will be roughly equal to one half the wavelength of the electromagnetic standing wave. If the resonant sensor is made small to reduce cost, it will tend to have a resonant frequency that is too high to measure directly with low cost semiconductor frequency coning techniques. For example, 1 GHz operation requires a 7.5 cm sensor size.

A solution to this problem is to operate the microwave oscillator in a mode-locked configuration in which the fundamental output frequency is amplitude modulated (AM) such that a lower frequency AM output signal is directly proportional to the fundamental frequency. Various detection techniques are then available to convert the power fluctuations of the AM signal to an electronic signal that can be counted. For instance, a high frequency diode can rectify the signal.

Figure 39:
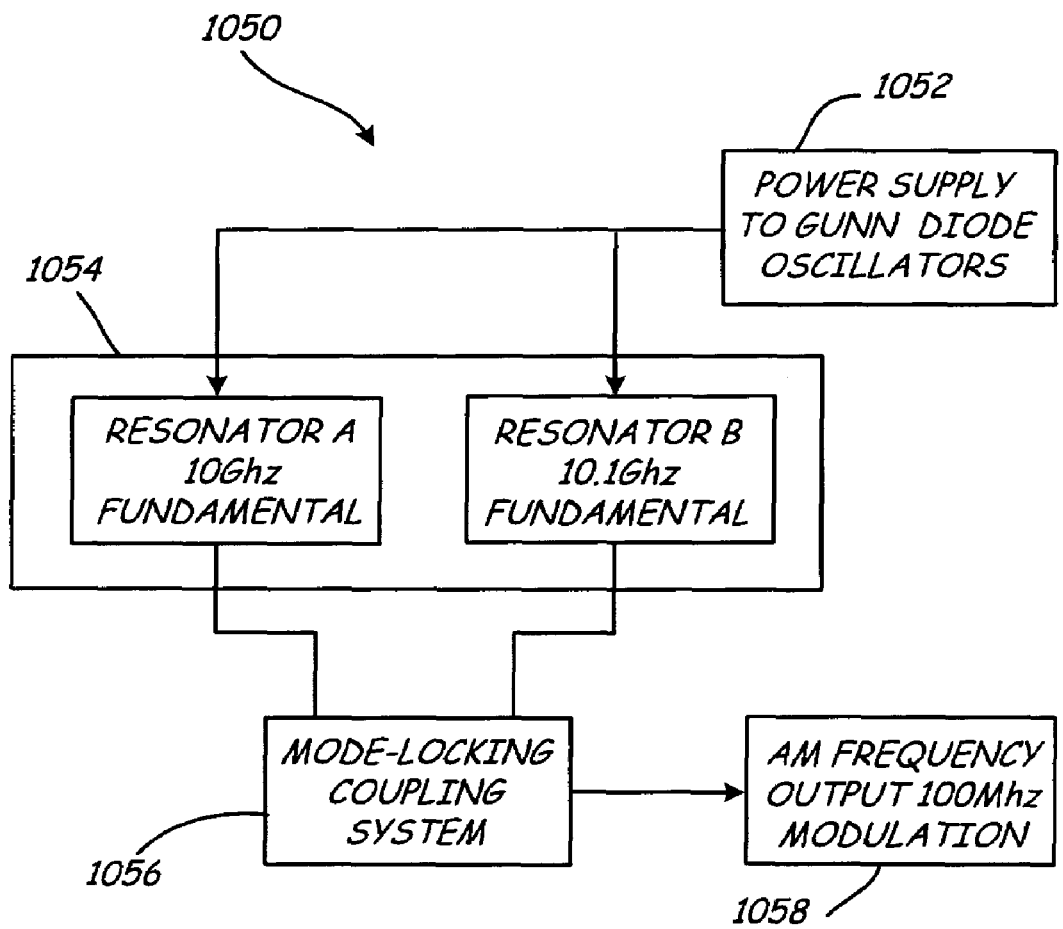
FIG. 39 is a block diagram of an embodiment using an array of mode-locked resonant sensors.

FIG. 39 illustrates an embodiment of the present invention which operates high frequency microwave resonant sensors in a mode-locked configuration. Sensing system 1050 includes power supply 1052, sensor structure 1054, mode locking coupling system 1056, and AM frequency output device 1058.

Sensor structure 1054 includes multiple resonators that are responsive to a common sensed parameter such as pressure. In this particular embodiment, sensor structure 1054 includes resonator A and resonator B which operate at fundamental frequencies 10 GHz and 10.1 GHz respectively. Each resonator includes a GHz oscillator, such as a Gunn diode oscillator coupled to a microwave resonant sensor, such as the sensors shown in FIGS. 22A-38B. Power supply 1052 supplies power to each oscillator, so that it oscillates at a different fundamental frequency, in this case 10 GHz and 10.1 GHz.

The output of resonators A and B is combined by mode locking coupling system 1056 to produce a unitary mode-locked AM output. The output of coupling system 1056 is sensed by output detector 1058.

With the system shown in FIG. 39, the size of each resonant sensor is reduced by a factor of 100, since the output frequency (100 MHz) to be detected is a factor of 100 lower than the fundamental frequencies (~10 GHz) at which each of the resonators is operating. This allows a resonator size of about 7.5 mm, which can be fabricated relatively inexpensively.

The operation of multiple oscillators in a mode-locked configuration is described in "Mode-Locked Oscillator Arrays" R. A. York and R. C. Compton, IEEE Microwave and Guided Wave Letters, Vol. 1, No. 8, August 1991, pp. 215-218.

Although FIG. 39 shows an embodiment using two resonators in a mode-locked configuration, additional resonators can be included in the sensor structure, with the resonators all having frequencies that are a function of the sensed parameter and are equally spaced in the frequency domain at a given value of the sensed parameter. In addition, although Gunn diode oscillators are one desirable form of oscillator for use in the embodiment shown in FIG. 39, other forms of oscillators can be used as well. For example, maser oscillators could also be used, where the pump operates at a desired pump frequency which is different than either the fundamental frequencies of the resonators or the difference frequencies between the sensor oscillators.

Many additional changes and modifications could be made to the disclosed embodiments without departing from the fair scope and spirit thereof. The scope of some changes is discussed above. The scope of others will be come apparent from the appended claims.

The invention claimed is:

1. A sensor for measuring a measurable parameter, the sensor comprising:
   a source of electromagnetic energy; and
   an electromagnetic resonator, disposed to receive at least a portion of the electromagnetic energy, the electromagnetic resonator having a dielectric body with a sensing surface responsive to changes in the measurable parameter at the sensing surface and the electromagnetic resonator defining a cavity forming a variable gap that varies in response to the sensing surface and that is positioned such that a resonant frequency associated with an electromagnetic standing wave in the dielectric body and the variable gap changes in response to changes in the measurable parameter;
   wherein the resonator is internal to the source, forming a cavity of a mode-locked source.

2. The sensor of claim 1, wherein the resonator comprises a resonant antenna.

3. The sensor of claim 1, wherein the resonator comprises a resonant transmission line.

4. The sensor of claim 1, wherein the measurable parameter is selected from the group consisting of pressure, temperature, flow rate, material composition, force, and strain.

5. The sensor of claim 1, further comprising a measuring apparatus for measuring a repetition rate of the energy.

6. A sensor for use in measuring a measurable parameter, the sensor comprising:
   a source of suboptical electromagnetic energy; and
   a resonator having a dielectric body with a variable cavity gap responsive to changes in the measurable parameter at a sensing surface, and having an electrically conductive layer on at least one interior wall of the dielectric body defining the variable cavity gap, the resonator defining a resonant frequency of a standing electromagnetic wave in the dielectric body and the variable cavity gap that is dependent upon the measurable parameter at the sensing surface, the resonator being disposed such that a signal from the sensor is a function of the resonant frequency;
   wherein the dielectric body, the electrically conductive layer and the variable cavity gap are configured to resonate at suboptical frequencies as a function of the measurable parameter.

7. The sensor apparatus of claim 6 wherein the resonator is internal to the source and forms a cavity of the source.

8. The sensor apparatus of claim 6, wherein the resonator forms a resonator that is external to the source.

9. The sensor of claim 6, wherein the resonator comprises a resonant antenna.

10. The sensor of claim 6, wherein the resonator comprises a resonant transmission line.

11. The sensor of claim 6, wherein the measurable parameter is selected from the group consisting of pressure, temperature, flow rate, material composition, force, and strain.

12. The sensor apparatus of claim 6, further comprising a measuring apparatus for measuring the frequency of the signal.

13. An apparatus for modulating, based on a measurable parameter, the output of a source producing electromagnetic energy, the apparatus comprising:
   a coupler coupled to receive the energy; and
   a high Q resonator having a dielectric body with a variable cavity gap configured to produce an effective dielectric constant that varies in response to changes in the measurable parameter, the high Q resonator coupled to the coupler for receiving the energy and creating an electromagnetic standing wave within the dielectric body and the variable cavity gap at a resonant frequency that is a function of the measurable parameter;
   wherein the source has a resonator characterized by a first Q value Q1, and the high Q resonator is characterized by a second Q value Q2, that is substantially higher than Q1.

14. The apparatus of claim 13, wherein the measurable parameter is selected from the group consisting of pressure, temperature, flow rate, material composition, force, and strain.

15. The apparatus of claim 13, wherein Q2 is at least 100.

16. A variable frequency resonator comprising an electromagnetic resonator having a dielectric body and a cavity defining a variable gap, and an electrically conductive layer on at least one interior wall of the dielectric body defining the cavity, the resonator producing an output at a resonant frequency that is dependent upon the variable gap which is disposed to alter a ratio of stored electric field and magnetic field energy of an electromagnetic standing wave in response to changes in the measurable parameter; wherein the dielectric body, the electrically conductive layer and the cavity are configured to resonate at suboptical frequencies as a function of the measurable parameter.

17. A method of sensing a measurable parameter, the method comprising:
   providing a resonator characterized by a resonant frequency that is a function of a variable gap in an internal cavity of a dielectric body of the resonator, the variable gap being responsive to the measurable parameter wherein the resonator includes an electrically conductive layer on at least one interior wall of the dielectric body defining the internal cavity;
   supplying suboptical electromagnetic energy to the resonator to produce an electromagnetic standing wave in the dielectric body and the variable gap; and
   sensing a suboptical resonant frequency of the electromagnetic standing wave to determine the measurable parameter.

18. A method of sensing a measurable parameter, the method comprising the steps of:
   providing a pulsed suboptical electromagnetic signal characterized by a repetition rate;
   providing a resonator having a dielectric body with a variable gap that varies in response to changes in the measurable parameter;
   supplying the pulsed suboptical electromagnetic signal to the resonator to produce a pulsed electromagnetic wave pattern in the dielectric body and the variable gap; and
   sensing variations in the repetition rate of the pulsed suboptical electromagnetic signal in response to variations in the variable gap.

19. A resonator having a dielectric body with a variable gap that varies in response to changes in a measurable parameter, and having an electrically conductive layer on at least one interior wall of the dielectric body defining the variable gap, the resonator configured for receiving suboptical electromagnetic energy and producing an electromagnetic standing wave in the dielectric body and the variable gap so that a characteristic of the suboptical electromagnetic energy changes in response to variations in the variable gap, wherein the dielectric body, electrically conductive layer and the variable gap are configured to resonate at suboptical frequencies, as a function of the measureable parameter.

20. The resonator of claim 19, wherein the suboptical electromagnetic energy is a continuous wave and the characteristic is frequency.

21. The resonator of claim 19, wherein the suboptical electromagnetic energy is a pulsed energy and the characteristic is repetition rate.

22. An electromagnetic resonant sensor comprising:
   a dielectric sensor body;
   a cavity within the sensor body having a variable gap between interior surfaces of the sensor body that varies as a function of a measurable parameter, the cavity being positioned within the sensor body so that an electromagnetic standing wave is formed within the body and the variable gap, and a resonant frequency of the sensor is a function of the measurable parameter; and
   an electrically conductive layer on at least one interior wall of the dielectric body defining the cavity; and
   wherein the sensor body, the electrically conductive layer and cavity are configured to resonate at suboptical frequencies as a function of the measureable parameter.

23. The electromagnetic resonant sensor of claim 22 wherein the electrically conductive layer has a ring or circular shape to cause the sensor to resonate as a ring resonator.

24. The electromagnetic resonant sensor of claim 22 wherein the electrically conductive layer has an elongated shape to cause the sensor to resonate as a transmission line.

25. The electromagnetic resonant sensor of claim 22 wherein the electrically conductive layer includes one or more slots to cause the sensor to resonate as a slot antenna.

26. The electromagnetic resonant sensor of claim 22 wherein the electrically conductive layer is shaped to cause the sensor to resonate as a dipole antenna.

27. The electromagnetic resonant sensor of claim 22 wherein the electrically conductive layer includes at least one opening to cause the sensor to resonate as a port antenna.

28. An electromagnetic resonant sensor for receiving suboptical electromagnetic energy and producing an output based upon an electromagnetic standing wave having a resonant frequency that is a function of a parameter to be measured, the sensor characterized by a dielectric body with a variable gap that changes dimension as a function of the parameter, and an electrically conductive layer on at least one interior wall of the dielectric body defining the variable gap; the dielectric body, the electrically conductive layer and the variable gap being configured to resonate at suboptical frequencies as a function of the measureable parameter so that the electromagnetic standing wave extends within the dielectric body and the variable gap and a change in gap dimension causes a change in the resonant frequency.

29. A sensor for use in measuring a measurable parameter, the sensor comprising:
   a source of suboptical electromagnetic energy; and
   a resonator having a dielectric body with a variable cavity gap responsive to changes in the measurable parameter at a sensing surface, the resonator defining a resonant frequency of a standing electromagnetic wave in the dielectric body and the variable cavity gap that is dependent upon the measurable parameter at the sensing surface, the resonator being disposed such that a signal from the sensor is a function of the resonant frequency;
   wherein the dielectric body and the variable cavity gap are configured to resonate at suboptical frequencies as a function of the measurable parameter; and
   wherein the resonator is internal to the source and forms a cavity of the source.

30. A resonator having a dielectric body with a variable gap that varies in response to changes in a measurable parameter, the resonator configured for receiving suboptical electromagnetic energy and producing an electromagnetic standing wave in the dielectric body and the variable gap so that a characteristic of the suboptical electromagnetic energy changes in response to variations in the variable gap, wherein the dielectric body and the variable gap are configured to resonate at suboptical frequencies, as a function of the measurable parameter, wherein the suboptical electromagnetic energy is a pulsed energy and the characteristic is repetition rate.

* * * * *

UNITED STATES PATENT AND TRADEMARK OFFICE
CERTIFICATE OF CORRECTION

| | |
|---|---|
| PATENT NO. | : 7,330,271 B2 |
| APPLICATION NO. | : 10/822425 |
| DATED | : February 12, 2008 |
| INVENTOR(S) | : Roger L. Frick |

It is certified that error appears in the above-identified patent and that said Letters Patent is hereby corrected as shown below:

Page 3, Left Column, Line 3, delete "Sensitivities and Exellent Stabilities," insert --Sensitivities and Excellent Stabilities--

Signed and Sealed this

Seventeenth Day of June, 2008

JON W. DUDAS
*Director of the United States Patent and Trademark Office*